(12) United States Patent
Carle et al.

(10) Patent No.: US 12,709,398 B2
(45) Date of Patent: Aug. 18, 2026

(54) AIRCRAFT WITH AN UNDUCTED FAN PROPULSOR

(71) Applicant: General Electric Company, Evendale, OH (US)

(72) Inventors: Sara Elizabeth Carle, Columbus, OH (US); Daniel L. Tweedt, West Chester, OH (US); Syed Arif Khalid, West Chester, OH (US); Andrew Breeze-Stringfellow, Montgomery, OH (US); William Bowden, Cleves, OH (US); Arthur W. Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/329,396

(22) Filed: Sep. 15, 2025

(65) Prior Publication Data

US 2026/0070665 A1 Mar. 12, 2026

Related U.S. Application Data

(63) Continuation-in-part of application No. PCT/US2024/040754, filed on Aug. 2, 2024, which is (Continued)

(51) Int. Cl.
*B64D 27/12* (2006.01)
*B64C 11/18* (2006.01)
(Continued)

(52) U.S. Cl.
CPC .............. *B64D 27/12* (2013.01); *B64C 11/18* (2013.01); *B64C 11/26* (2013.01); *B64C 11/48* (2013.01); *B64D 35/02* (2013.01); *B64D 35/04* (2013.01)

(58) Field of Classification Search
CPC ....... B64D 27/12; B64C 11/305; B64C 11/48; F01D 5/022
See application file for complete search history.

(56) References Cited

U.S. PATENT DOCUMENTS 5,079,916 A 1/1992 Johnson
5,123,813 A 6/1992 Przytulski
(Continued)

FOREIGN PATENT DOCUMENTS

FR 3129428 A1 5/2023
FR 3129436 A1 5/2023
(Continued)

OTHER PUBLICATIONS

"Could an open fan engine cut carbon emissions for more sustainable aviation?"; https://www.airbus.com/en/newsroom/stories/2022-07-could-an-open-fan-engine-cut-carbon-emissions-for-more-sustainable; Jul. 19, 2022; 3 pgs.
(Continued)

*Primary Examiner* — Ashesh Dangol
*Assistant Examiner* — Cindi M Curry
(74) *Attorney, Agent, or Firm* — Fitch, Even, Tabin & Flannery, LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor.

13 Claims, 16 Drawing Sheets

Related U.S. Application Data a continuation-in-part of application No. 18/652,052, filed on May 1, 2024, now Pat. No. 12,384,522, which is a continuation-in-part of application No. 18/230,609, filed on Aug. 4, 2023, now Pat. No. 12,365,471.

(51) Int. Cl.

| | |
|---|---|
| ***B64C 11/26*** | (2006.01) |
| ***B64C 11/48*** | (2006.01) |
| ***B64D 35/02*** | (2024.01) |
| ***B64D 35/04*** | (2006.01) |

(56) References Cited

U.S. PATENT DOCUMENTS

| | | | | |
|---|---|---|---|---|
| 5,135,185 | A | 8/1992 | Adamson | |
| 5,136,185 | A | 8/1992 | Fleming | |
| 5,486,095 | A | 1/1996 | Rhoda | |
| 6,447,250 | B1 | 9/2002 | Corrigan | |
| 8,403,624 | B2 | 3/2013 | Xie | |
| 8,714,475 | B2 | 5/2014 | Gall | |
| 8,869,504 | B1 | 10/2014 | Schwarz | |
| 9,242,721 | B2 | 1/2016 | Neuteboom | |
| 9,399,922 | B2 | 7/2016 | Lamboy | |
| 9,500,126 | B2 | 11/2016 | Schwarz | |
| 9,567,090 | B2 | 2/2017 | Gallet | |
| 9,759,160 | B2 | 9/2017 | Sankrithi | |
| 10,040,559 | B2 | 8/2018 | Hoisington | |
| 10,442,541 | B2 | 10/2019 | Miller | |
| 10,458,425 | B2 | 10/2019 | Boyer | |
| 10,578,018 | B2 | 3/2020 | Schwarz | |
| 10,605,117 | B2 | 3/2020 | Wang | |
| 10,669,881 | B2 | 6/2020 | Breeze-Stringfellow | |
| 10,738,630 | B2 | 8/2020 | Li | |
| 10,760,488 | B2 | 9/2020 | Schwarz | |
| 10,907,495 | B2 | 2/2021 | Breeze-Stringfellow | |
| 11,136,109 | B2 | 10/2021 | Wood | |
| 11,492,918 | B1 | 11/2022 | Ostdiek | |
| 11,572,827 | B1 * | 2/2023 | Khalid | B64C 7/02 |
| 12,000,344 | B2 | 6/2024 | Levisse | |
| 12,280,883 | B2 * | 4/2025 | Bowden | B64D 27/402 |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,365,446 | B2 | 7/2025 | Carle | |
| 12,365,471 | B2 | 7/2025 | Carle | |
| 12,378,933 | B2 | 8/2025 | Fefermann | |
| 12,384,522 | B2 | 8/2025 | Carle | |
| 12,448,139 | B2 * | 10/2025 | Bowden | B64D 29/02 |
| 12,473,832 | B2 | 11/2025 | Sibbach | |
| 12,473,863 | B2 | 11/2025 | Sibbach | |
| 2012/0119023 | A1 | 5/2012 | Moore | |
| 2018/0362170 | A1 * | 12/2018 | Stuart | B64D 27/404 |
| 2019/0185170 | A1 * | 6/2019 | Schelfaut | B64D 27/406 |
| 2020/0123921 | A1 | 4/2020 | Kray | |
| 2023/0021836 | A1 | 1/2023 | Riddle | |
| 2024/0410319 | A1 | 12/2024 | Becoulet | |
| 2025/0018895 | A1 | 1/2025 | Howell | |
| 2025/0042537 | A1 | 2/2025 | Carle | |
| 2025/0042538 | A1 | 2/2025 | Carle | |
| 2025/0042558 | A1 | 2/2025 | Carle | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Olivier | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |
| 2026/0008550 | A1 | 1/2026 | Carle | |
| 2026/0015090 | A1 | 1/2026 | Carle | |

FOREIGN PATENT DOCUMENTS

| | | | |
|---|---|---|---|
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130897 | A1 | 6/2023 |
| FR | 3132729 | A1 | 8/2023 |

OTHER PUBLICATIONS

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

Attariwala, Joetey; "Coming to a Theatre near You"; published Feb./Mar. 2016 Issue (Oct. 26, 2017); https://www.armadainternational.com/2017/10/airbus-a400m-strategic-turboprop-freighter-programme/; 9 pgs.

* cited by examiner

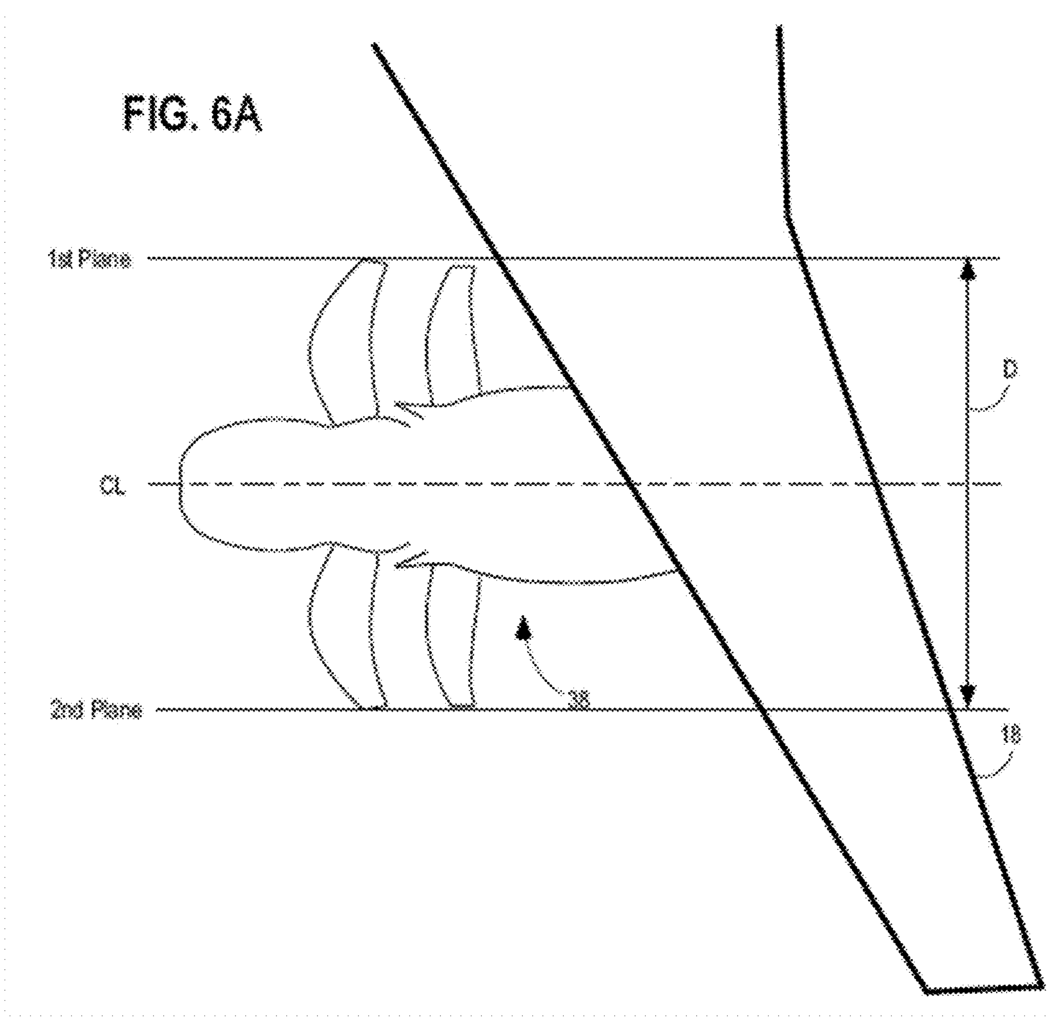
FIG. 6B
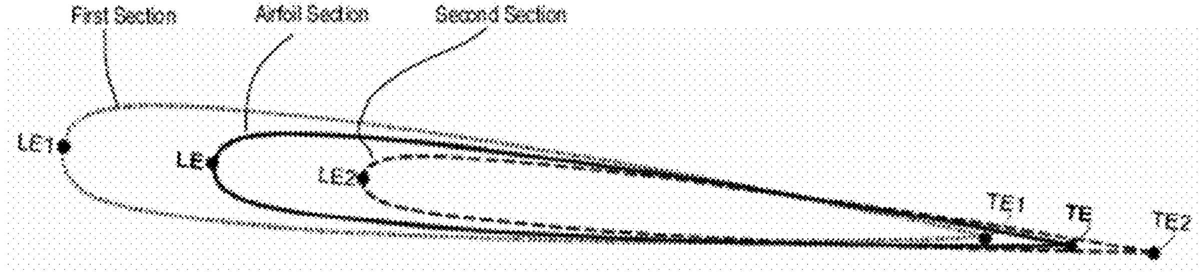

FUSELAGE CENTERPLANE (FCP)

WING SEMI-SPAN B/2

WINGSPAN B

LATERAL OFFSET POSITION (LOP)

18

18

P

P

38

38

12

FUSELAGE CENTERPLANE (FCP)

| | RHUB_LE (IN) | RHUB_TE (IN) | RFAN_LE (IN) | RFAN_TE (IN) | FAN BLADE COUNT | THRUST RATING (LBS) | FLTCF | FLTOR |
|---|---|---|---|---|---|---|---|---|
| EXAMPLE 1 | 22 | 25 | 77 | 77 | 14 | 35000 | 1.11 | 1.06 |
| EXAMPLE 2 | 22.5 | 24.7 | 82.2 | 82.2 | 14 | 35000 | 1.098 | 1.038 |
| EXAMPLE 3 | 21.05 | 23.27 | 76.8 | 76.4 | 16 | 35000 | 1.111 | 1.049 |
| EXAMPLE 4 | 24 | 24 | 82.2 | 80.5 | 14 | 35000 | 1.021 | 1.030 |
| EXAMPLE 5 | 20.25 | 20.25 | 69.7 | 68.2 | 14 | 20000 | 1.022 | 1.031 |
| EXAMPLE 6 | 18.96 | 21.07 | 69.3 | 69.02 | 14 | 20000 | 1.116 | 1.050 |
| EXAMPLE 7 | 31.23 | 34.63 | 115 | 114.2 | 12 | 65000 | 1.117 | 1.053 |

FIG. 13

AIRCRAFT WITH AN UNDUCTED FAN PROPULSOR

CROSS-REFERENCE TO RELATED APPLICATIONS

This application claims priority to U.S. patent application Ser. No. 18/230,609, filed on Aug. 4, 2023, and Ser. No. 18/652,052, filed May 1, 2024, and International Patent Application No. PCT/US2024/040754, filed Aug. 2, 2024, the disclosures of which are hereby incorporated by reference in their entireties.

FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which:

FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4;

FIG. 6B comprises a schematic side elevation view of a first section and a second section of the aircraft wing, which sections are used to determine an effective quarter chord point (QC) of the airfoil section in FIG. 4;

FIG. 13 is a table of example engines of the present disclosure; and

Figure 1:
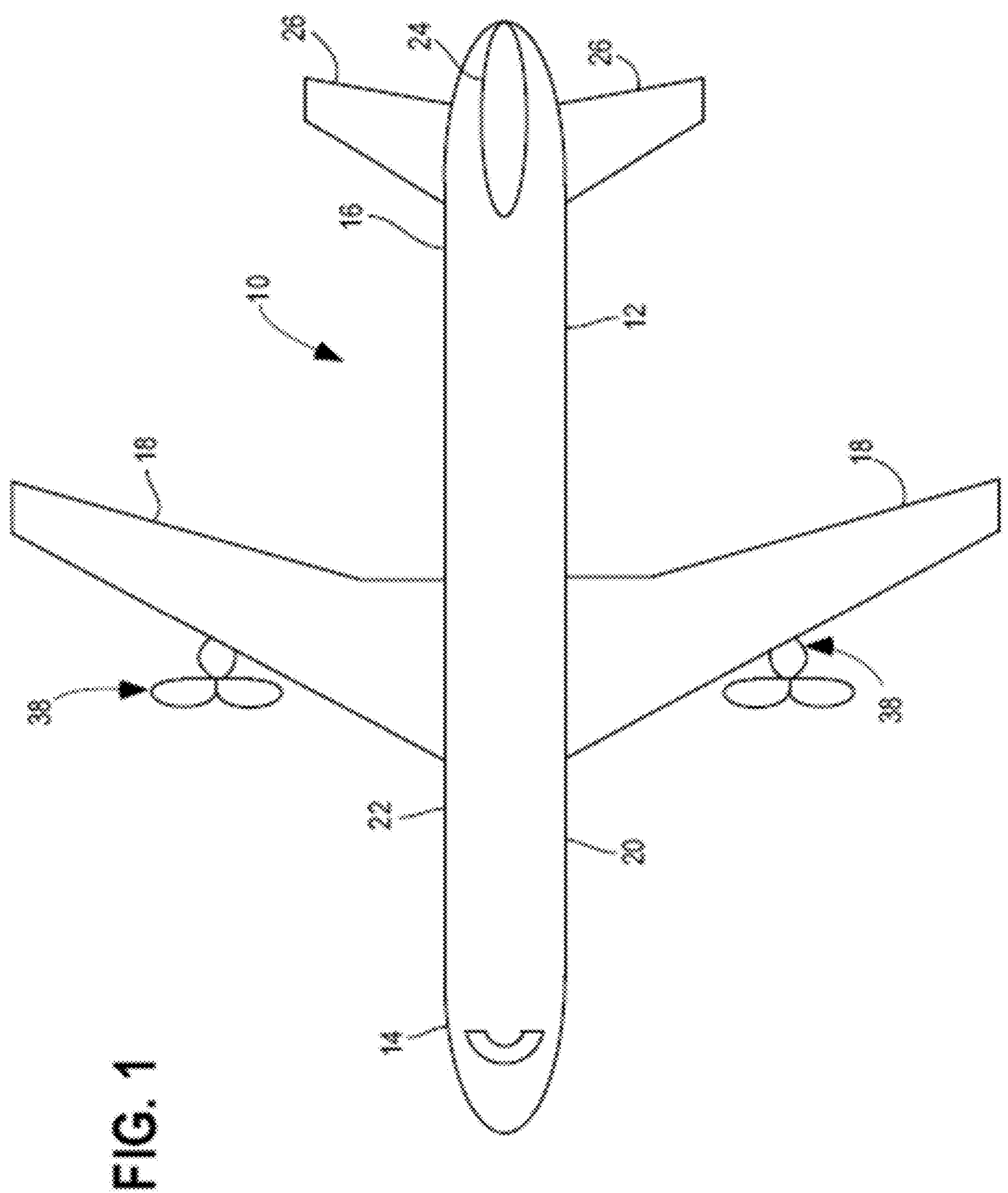
FIG. 1 comprises a top plan view of an aircraft as configured in accordance with various embodiments of these teachings, with undermounted, unducted fan propulsors mounted on forward wings of the aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated.

The terms "coupled," "fixed," "attached to," and the like refer to both direct coupling, fixing, or attaching, as well as indirect coupling, fixing, or attaching through one or more intermediate components or features, unless otherwise specified herein.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

"Airfoil section" and "effective quarter chord point (QC)" are defined as follows.

"Airfoil section" is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LE1 at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 6 and 6B. An "Airfoil Section" defined herein has its leading and trailing edges TE, LE determined in this manner. "Effective Quarter-chord point" ("QC") is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

"Cruise Speed" refers to aircraft speed and applies to a vehicle with a cruising altitude up to approximately 65,000 ft. In certain embodiments, cruise altitude is between approximately 28,000 ft. and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

It is understood that the plurality blades, whether forward or rearward, may have a variation of root forward-most points and root rearward-most points. This can be due to both installed position as well as orientation in the case of variable pitch blades. For purposes of defining the distances TRL, RTL, and VTL it is understood that a rotating blade or rotating array of blades are orientated such that the respective leading edges of the blades are in their most forward position, e.g., a feathered position. The respective trailing edge position is also obtained when the leading edge is in the most forward position. For purposes of defining the distances TRL, RTL, and VTL it is understood that the forward or leading edge or rearward or trailing edge of a stationary blade (or vane) or array of stationary blades (or vanes) is the most forward or leading edge position across the array of vanes or the most rearward or trailing edge position across the array of vanes.

"Blade" can refer to a stationary or rotating blade. "Stationary blade(s)" has the same meaning as "vane(s)".

Figure 3:
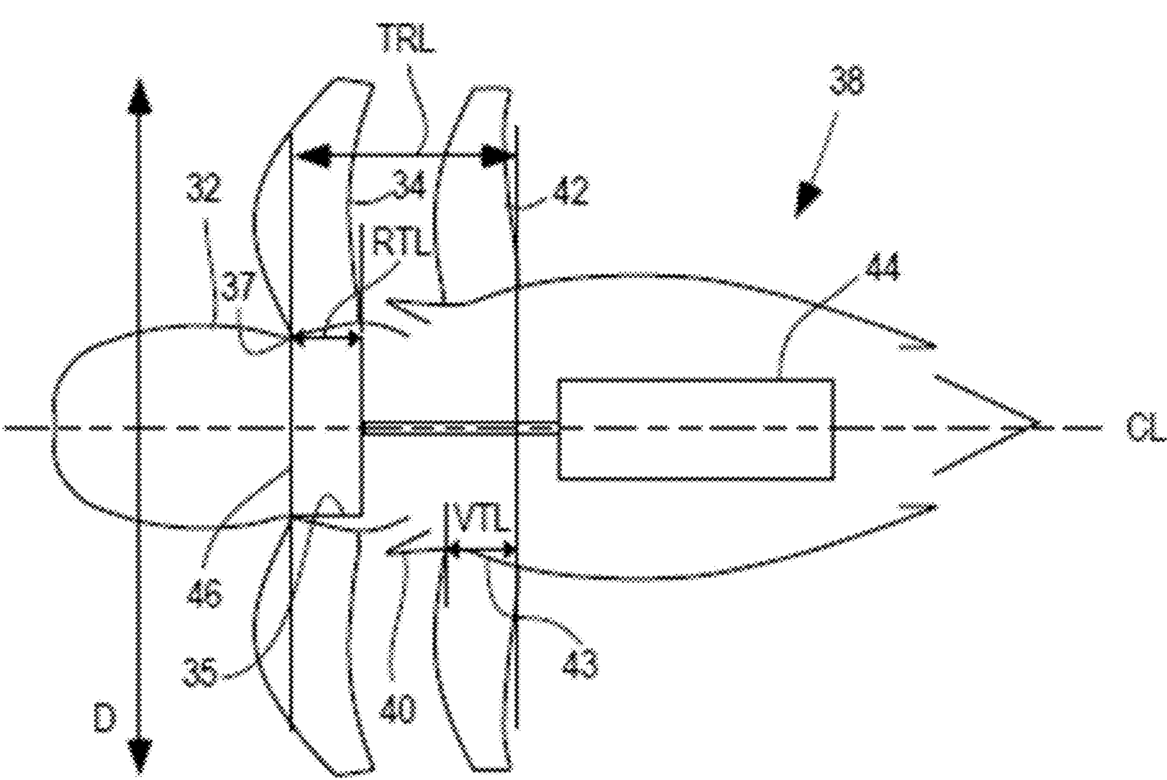
FIG. 3 comprises an elevational cross-sectional view of an exemplary unducted fan propulsor having a plurality of blades arranged in a forward array and a rearward array.

"Unducted fan propulsor" as used herein means an aircraft engine characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or fan nacelle. FIG. 3 depicts an unducted fan propulsor. Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach.

"Fuselage centerplane" ("FCP") is defined as a plane that is located equidistant from the wingtips, intersecting the fuselage, and containing the gravity vector when the aircraft is on the ground.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The term "turbomachine" refers to a machine including one or more compressors, a heat generating section (e.g., a combustion section), and one or more turbines that together generate a torque output.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The term "disk loading" refers to an average pressure change across a plurality of rotor blades of a rotor assembly, such as the average pressure change across a plurality of fan blades of a fan.

As used herein, the term "rated speed" with reference to a gas turbine engine refers to a maximum rated speed of the gas turbine engine. For example, in an engine certified by the Federal Aviation Administration ("FAA"), the rated speed refers to a rotation speed of the engine during the highest sustainable and continuous power operation in the certification documents, such as a rotational speed of the gas turbine engine when operating under a maximum continuous operation.

The term "cruise operating mode" refers to a specific configuration or setting of the gas turbine engine that controls for, e.g., performance and fuel efficiency during a cruise phase of flight.

The term "thrust rating" for a gas turbine engine refers to a maximum amount of thrust the gas turbine engine can generate when operating at the rated speed during standard day operating conditions (i.e., sea level under standard temperature and pressure conditions).

As used herein, the term "fan pressure ratio" as it relates to a plurality of fan blades of a fan, refers to a ratio of an air pressure immediately downstream of the fan blades during operation of the fan to an air pressure immediately upstream of the fan blades of the fan during operation of the fan.

The term "bypass ratio" refers to a ratio in a gas turbine engine of a mass flowrate of an airflow from a primary fan that is bypassed around the engine's upstream-most ducted inlet (downstream of the primary fan of the engine) to a mass flowrate of an airflow that passes through the engine's ducted inlet. For example, in the embodiment of FIGS. 1, and 4 discussed below, the bypass ratio refers to a mass flowrate of an airflow from a fan 38, 152 that flows over an outer casing 18 or a fan cowl 170 to a mass flowrate of an airflow from the fan 38, 152 that flows through the engine inlet 20, 182. The bypass ratio may be defined during operation of the gas turbine engine in a cruise operating mode.

As used herein, the term "composite material" refers to a material produced from two or more constituent materials, wherein at least one of the constituent materials is a non-metallic material. Example composite materials include polymer matrix composites (PMC), ceramic matrix composites (CMC), chopped fiber composite materials, etc.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix. Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

The inventors were faced with a problem of how to improve thrust delivered to an aircraft by an unducted fan propulsor without increasing the required engine power delivered to the unducted fan of the unducted fan propulsor.

It was surprisingly found that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor it was surprisingly found by placing the engine so that it can take advantage of the high pressure flow induced by the wing (and/or a horizontal stabilizer), engine thrust may increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, may instead be offset by placing the engine at a more optimal location relative to the wing.

Additionally, the inventors found that the installed engine's improved position also positively influences the noise produced by the wing-engine interaction during flight at cruise conditions.

It was surprisingly found that by adapting a particular location on an unducted fan propulsor relative to an aircraft wing's effective quarter chord point (QC), the desired result of offsetting interference and scrubbing drag without increasing the power delivered to the fan could be achieved for an unducted fan propulsor.

It was also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 2:
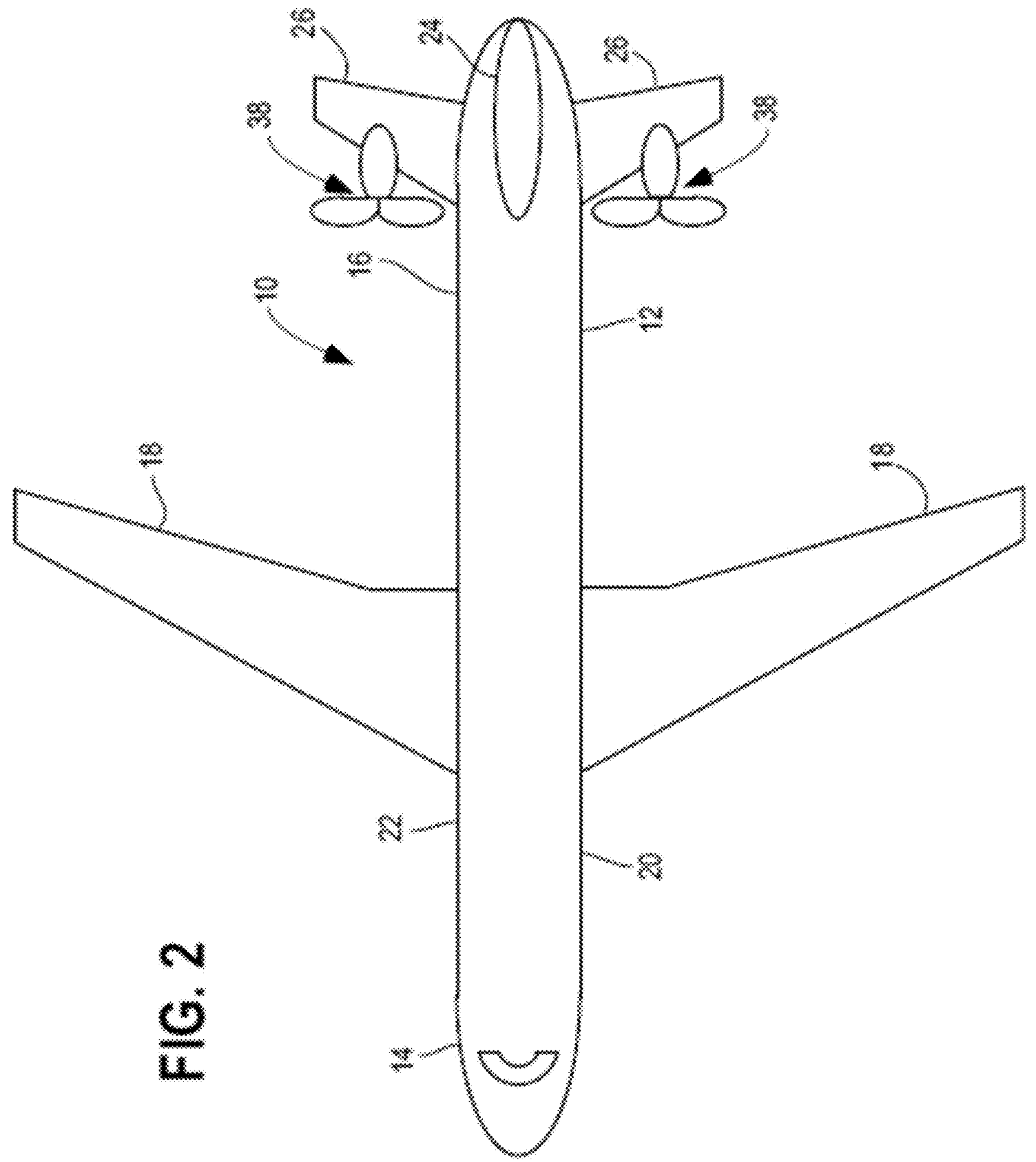
FIG. 2 comprises a top plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. An unducted fan propulsor 38 is undermounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 30 or 38 may be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of rotatable propeller assembly 32 on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL. The unducted fan propulsor 38 of FIG. 3 includes a second array of blades or vanes, which are non-rotating or static. In some embodiments, a non-rotating stationary element in the form of vane assembly 40 includes an array of vanes 42 disposed around CL.

Each of the blades 34 has a root 35 where the blade 34 is attached to the rotatable propeller assembly 32, and each blade 34 defines a root length (RTL). The root length (RTL) is defined as the axial extent (in a direction parallel to CL) from the radially innermost leading edge (LE) of the blade 34 airfoil, e.g., closest to CL, to the axial location of the radially innermost trailing edge (TE) of the blade 34 airfoil.

Figure 4:
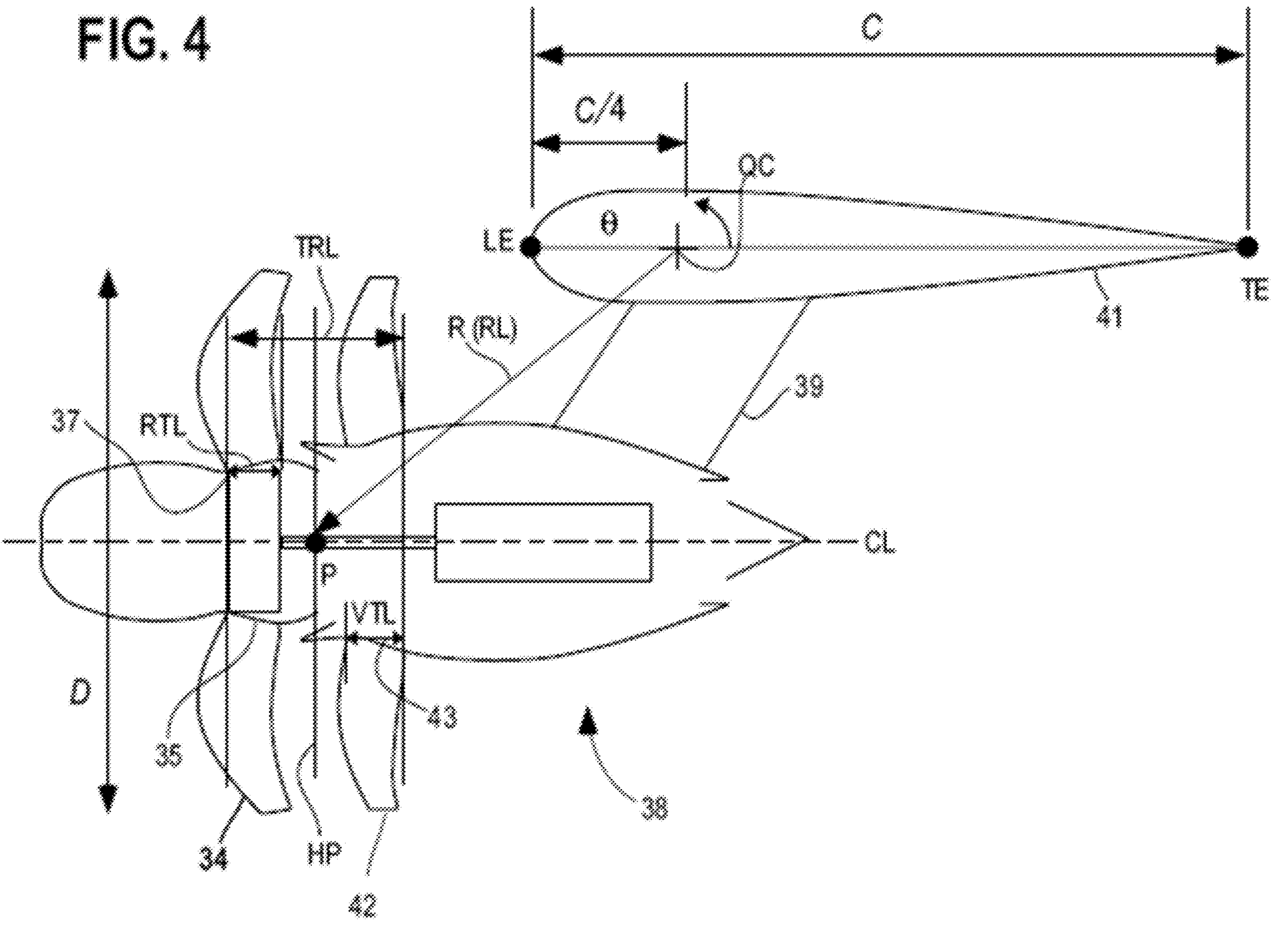
FIG. 4 comprises a schematic side elevation view showing the location of the unducted fan propulsor of FIG. 3 relative to an airfoil section.

Each of the vanes 42 also has a root 43 with a vane root distance VTL where the vane 42 is attached to the non-rotating vane assembly 40. The total root length (TRL) is the distance between the leading edge (LE) of the blade 34 airfoil (radially nearest to CL) of the blades 34 and the trailing edge (LE) of the root 43 of the vanes 42, as shown in FIGS. 3 and 4. TRL is a measured axial distance from the radial innermost LE of the foremost row of blades/vanes and the trailing edge (TE) of the vanes 42. In some embodiments, the second array may instead be a second rotating elements and the TRL is the measured axial distance from the radially innermost LE of the blades 34 of the first rotating element and the TE of the root of the blades of the second rotating elements. In some embodiments, the vanes 42 may be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g. vanes) may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

Referring to FIG. 4, for purposes explained more later, the unducted fan propulsor 38 has a point P. For the unducted fan propulsor 38 with a first array of blades or vanes 34 and a second array of blades or vanes 42, as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or vanes 42. The TRL of an unducted fan propulsor is defined as the distance between the LE of the root of the forward row of blades/vanes and the rearward edge of the root of the aftmost blade/vane.

Referring again to FIG. 3, the exemplary unducted fan propulsor 38 includes a drive mechanism 44 that provides torque and power to the propeller assembly 32 through a transmission 46. The drive mechanism 44 may be a gas turbine engine and associated transmission 46. Transmission 46 delivers torque from the drive mechanism 44 to the propeller assembly 32. The transmission system can be configured as a direct drive engine, transferring power from a power turbine or low pressure turbine (LPT) to the propeller assembly, or an indirect drive system where torque from the LPT is transferred to the propeller assembly 32 through a gearbox. The gearbox reduces a rotation speed of the drive shaft to match a desired rotational speed for the propeller assembly 32. The gas turbine engine includes in serial order a compressor, combustor, high pressure turbine and the LPT. In other embodiments the drive mechanism may generate power partially or fully by an electric motor. In the former case the drive mechanism is a hybrid electric drive mechanism including a gas turbine engine where a drive shaft includes an electric motor-generator for generating torque. In the latter case the drive mechanism is an electric motor.

The unducted fan propulsor 38 is attached relative to the wings 18 or horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated with it, where the airfoil section 41 is defined above.

As depicted in FIG. 4, a chord line C of the airfoil section, length C as shown, is a straight line extending from LE to TE of the airfoil section (it will be understood that the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5A:
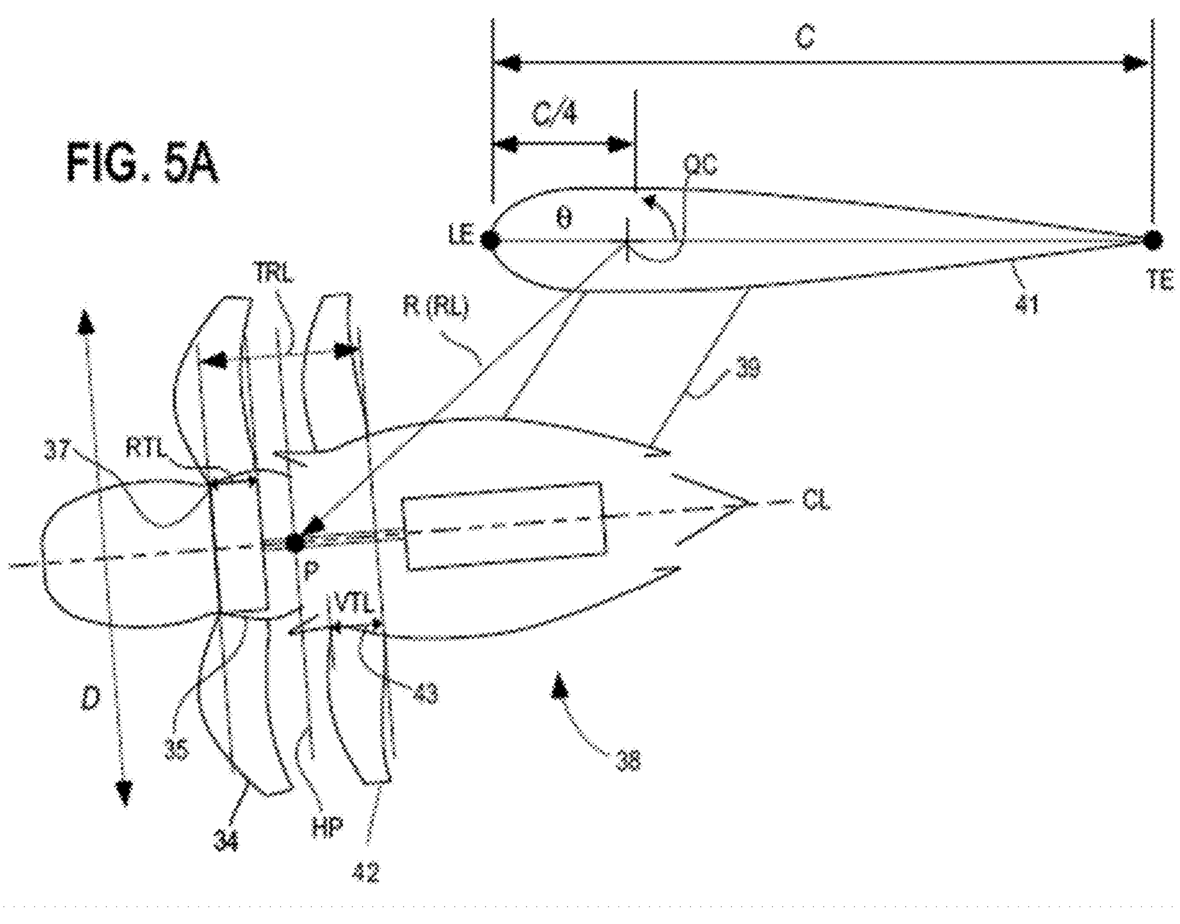
FIG. 5A is a schematic side elevation view similar to FIG. 4 and showing the unducted fan propulsor pitched downward relative to the airfoil section.
Figure 5B:
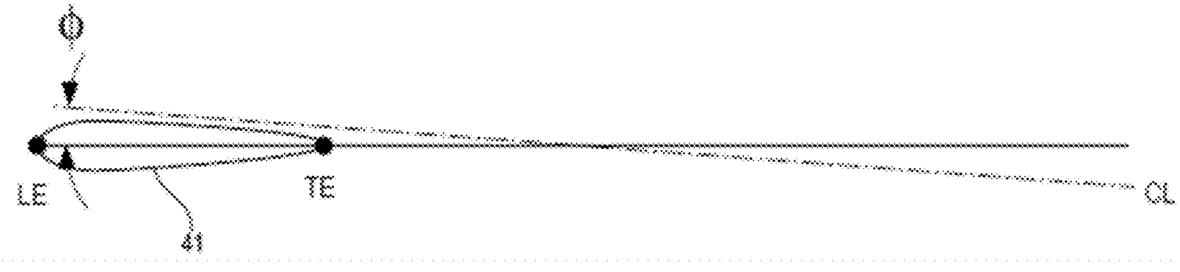
FIG. 5B defines a pitch angle Φ for the unducted fan propulsor relative to a chord line of the airfoil section in FIG. 4.

As shown in FIG. 4, the CL of the propulsor 38 and the chord line C are parallel to each other, corresponding to a zero pitch of the propulsor relative to the chord line C. The propulsor 38 can be pitched at different angles relative to the chord line, such as pitched downward as shown in FIG. 5A. FIG. 5B defines a pitch angle Φ for the propulsor 38, which is the angle spanned between the propulsor centerline CL and chord line C. Positive pitch corresponds to a clockwise rotation of CL relative to C. The pitch angle Φ can be fixed or variable during flight. For underwing installations, the pitch angle Φ can vary between −5 and +2 degrees, or it can vary between −3 and 0 degrees. During cruise conditions, propulsor pitch and toe angle (FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle Φ can vary between −2 and +5 degrees to more align with downwash created by the wing.

The position of the open fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figures 6C, 6D:
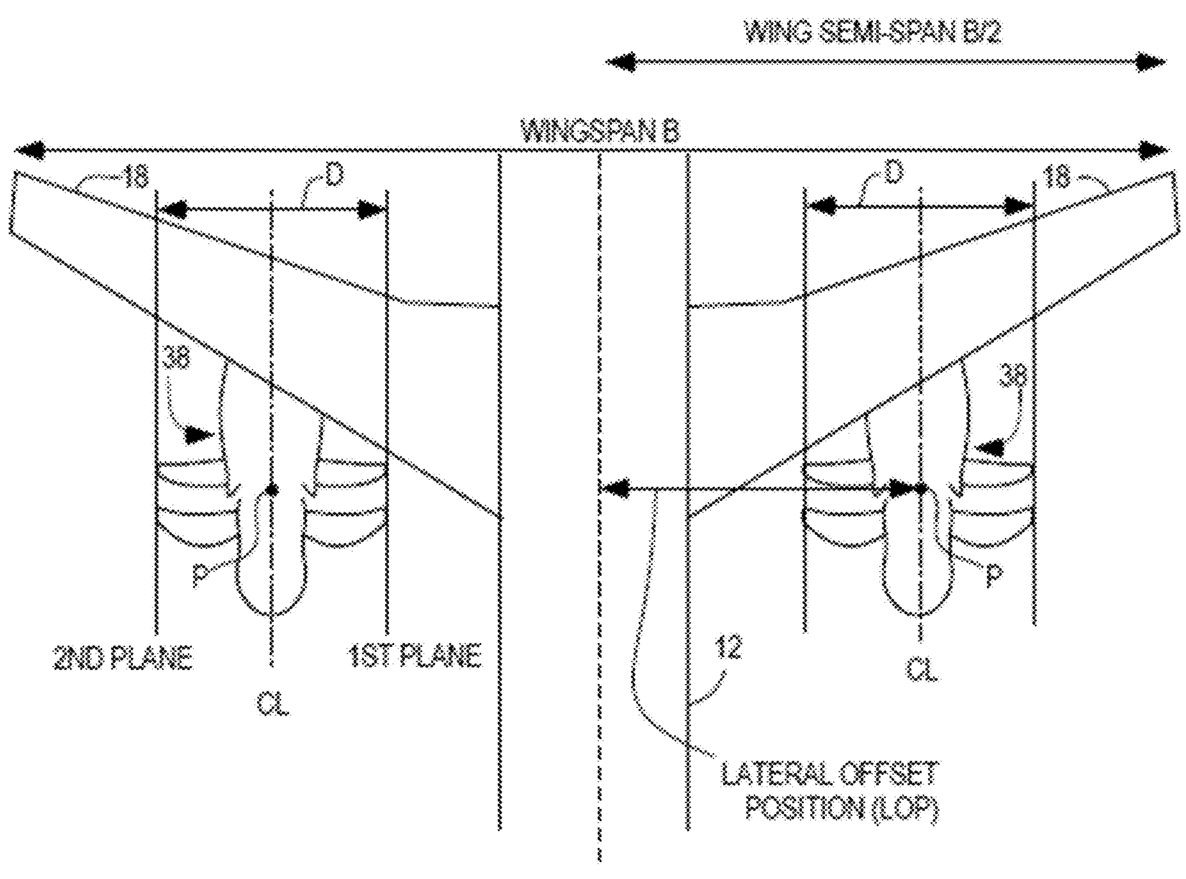
FIG. 6C comprises a schematic top plan view of a portion of an aircraft having a pair of wings extending from the fuselage with the propulsor of FIG. 3 mounted relative to each of the wings.
FIG. 6D comprises a schematic front elevation view of the aircraft portion of FIG. 6C.
Figure 6E:
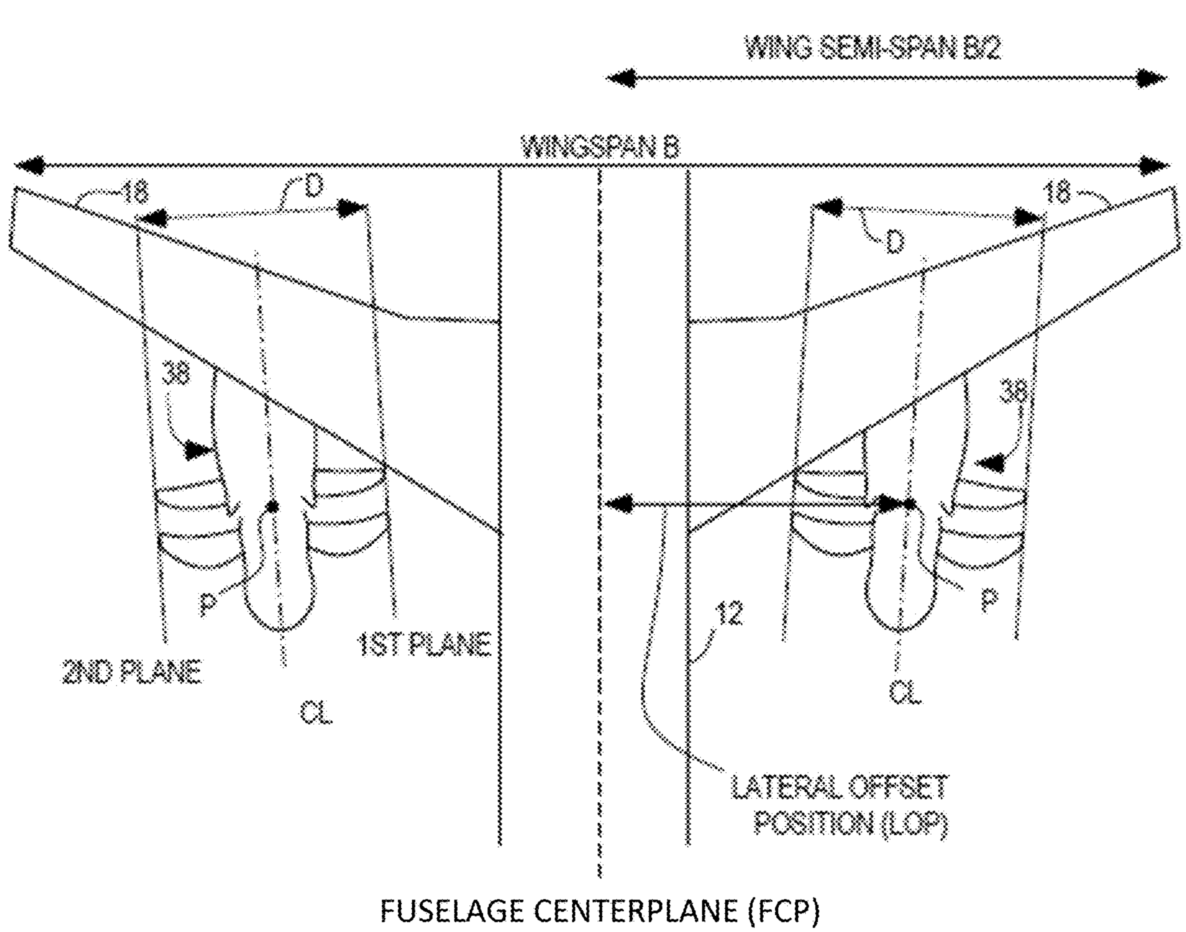
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toe angle can provide added benefit when positive (i.e., the rotor toed-in towards the fuselage with the forward end of the propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)". The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)".

The angle θ is measured relative to a datum that is the airfoil section chord line (e.g., in FIG. 6 the vector R is located by an angle that is between 180 and 270 degrees measured counterclockwise about origin QC relative to the chord line). When viewed looking from an outboard position towards an inboard position (e.g., the fuselage), θ is positive in a counter-clockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section tend to offset scrubbing and interference drag for an unducted fan propulsor.

Figure 9:
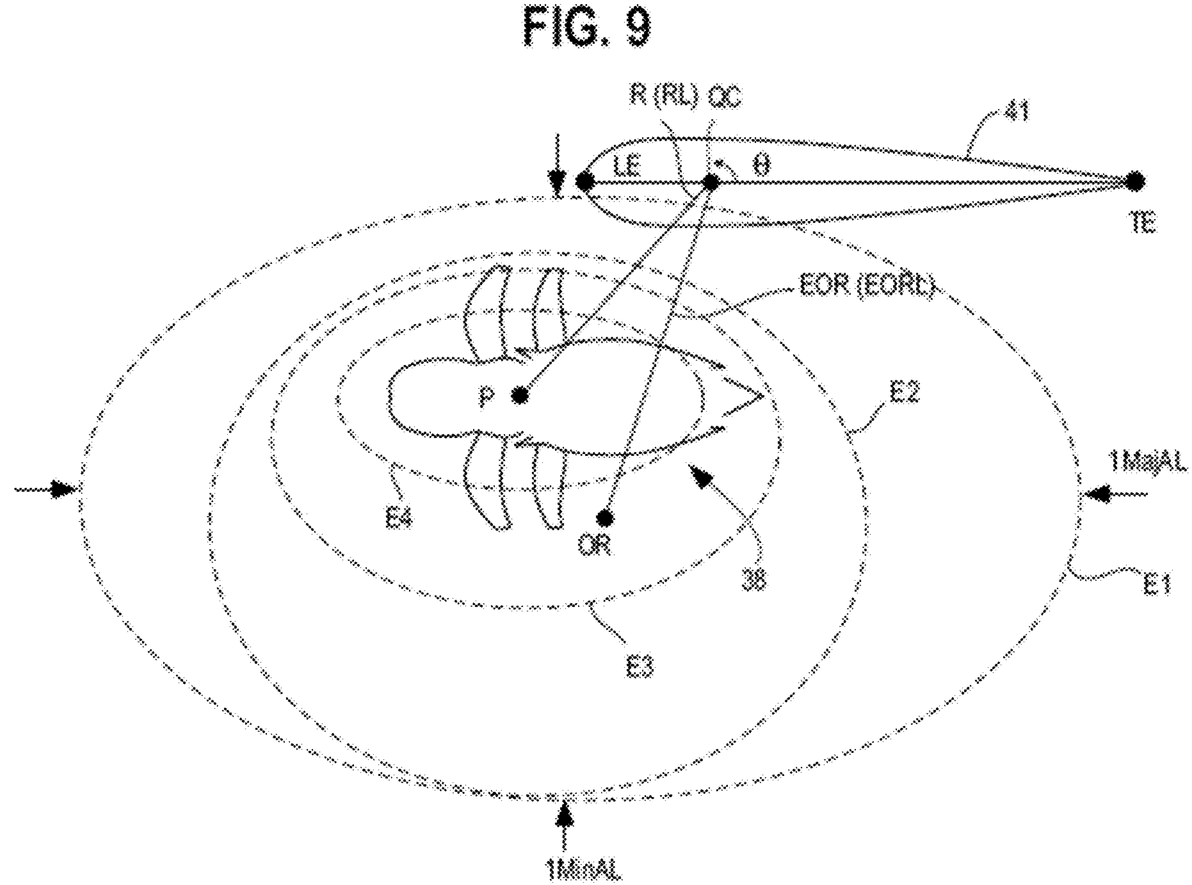
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
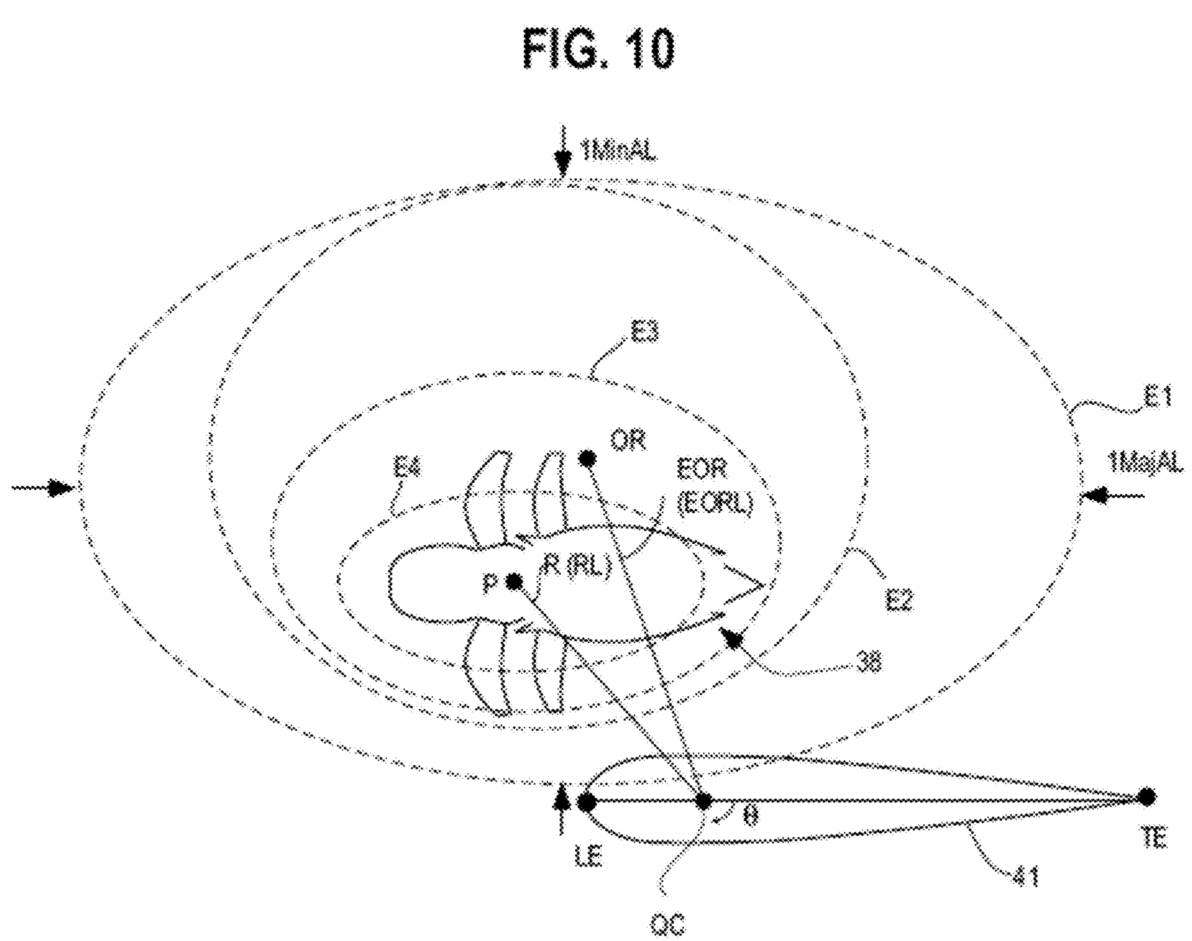
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counterclockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1MajAL) and a first minor axis length (1MinAL), where 1MajAL/D is 2.8 and 1MinAL/D is 1.7. A unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and θ of 248.8°. The second ellipse E2 has a second major axis length (2MajAL) and a second minor axis length (2MinAL), where 2MajAL/D is 1.86 and 2MinAL/D is 1.56. A unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3MajAL) and a third minor axis length (3MinAL), where 3MajAL/D is 1.4 and 3MinAL/D is 0.9. A unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4MajAL) and a fourth minor axis length (4MinAL), where 4MajAL/D is 0.94 and 4MinAL/D is 0.44. A unducted fan propulsor located within E4 tends to offset scrubbing and interference drag.

The location of the unducted fan propulsor system (i.e., point P) relative to the airfoil section may also be expressed in terms of the following expressions:

$$\frac{RL}{D} + \frac{\left(\sqrt{a*\left[b*\sin^2(\theta) - c*\cos^2(\theta) + d*\sin(\theta)*\cos(\theta)\right]} + e*\sin(\theta) + f*\cos(\theta)\right)}{g*\sin^2(\theta) + h*\cos^2(\theta)} > 0$$

and $$\frac{RL}{D} + \frac{\left(-\sqrt{a*\left[b*\sin^2(\theta) - c*\cos^2(\theta) + d*\sin(\theta)*\cos(\theta)\right]} + e*\sin(\theta) + f*\cos(\theta)\right)}{g*\sin^2(\theta) + h*\cos^2(\theta)} < 0$$

where 0.07<RL/D<1.98 and 0 is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where 0.254<RL/D<1.86 and 0 is between 199° and 306°, and where a, b, c, d, e, f, g and h have the values set forth in the above table under the heading "Sixth Emb."

In a seventh embodiment, the point P of the unducted fan propulsor 38 can be defined by the above expression, but where 0.369<RL/D<1.43 and 0 is between 204° and 291°, and where a, b, c, d, e, f, g and h have the values set forth in the above table under the heading "Seventh Emb.".

In an eighth embodiment, the point P of the unducted fan propulsor 38 can be defined by the above expression, but where 0.477<RL/D<0.9455 and θ is between 211° and 274°, And where a, b, c, d, e, f, g and h have the values set forth in the above table under the heading "Eighth Emb."

Figure 7:
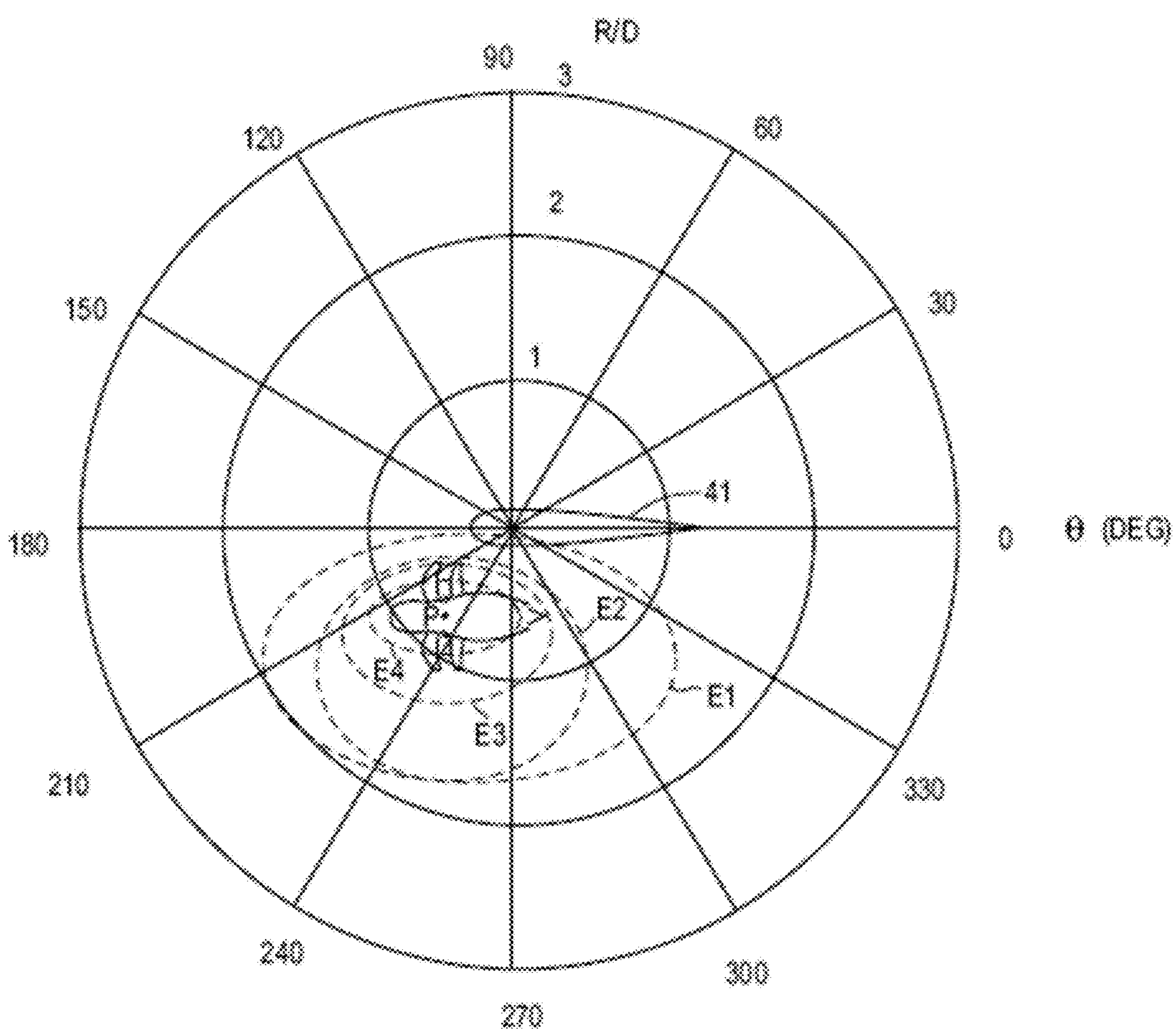
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
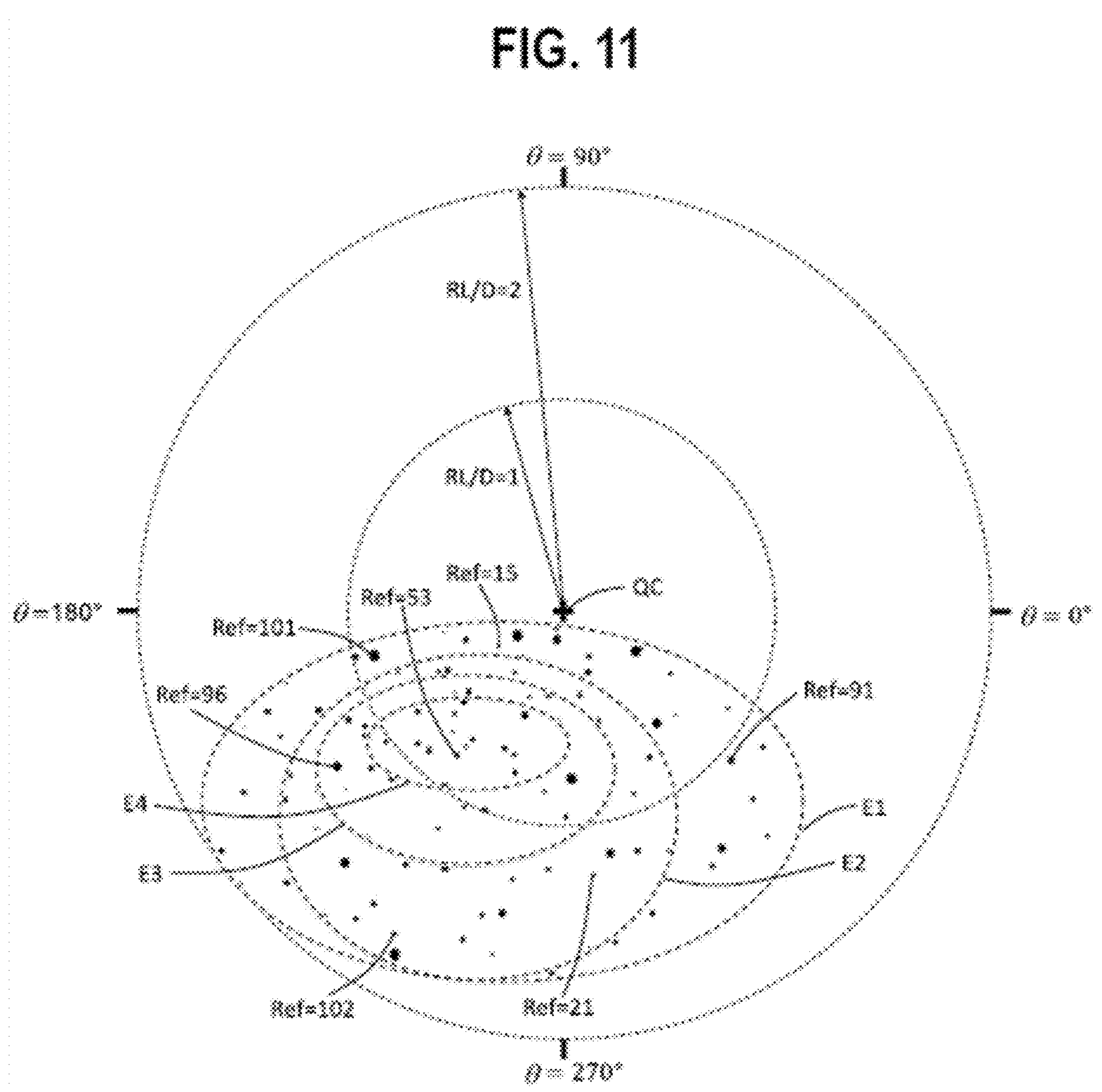
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3-6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref." refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, may be thought of as an axis passing through θ=0 deg and 0-180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale). The rotating blades diameter (D) may be between 2-50, 8-16, 10-15, 12-14, or 14-16 feet.

TABLE 1

P-location relative to the effective quarter chord point (QC)

| Ref. | Type of aircraft | RL (ft) | D (ft) | θ (deg) | RL/D |
|---|---|---|---|---|---|
| 1 | C I | 2.60 | 2.0 | 220.00 | 1.30 |
| 2 | F I | 1.07 | 2.0 | 189.00 | 0.54 |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |

TABLE 1-continued

P-location relative to the effective quarter chord point (QC)

| Ref. | Type of aircraft | RL (ft) | D (ft) | θ (deg) | RL/D |
|---|---|---|---|---|---|
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |
| 71 | B H | 16.89 | 14.0 | 201.87 | 1.21 |
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |
| 79 | F G | 21.23 | 16.0 | 246.67 | 1.33 |
| 80 | A E | 8.64 | 16.0 | 290.40 | 0.54 |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3-6 provide exemplary embodiments for EORL and D for each of the first ellipse E1, second ellipse E2, third ellipse E3 and fourth ellipse E4, respectively, relative to the quarter chord point (QC).

TABLE 3

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |

TABLE 4-continued

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |

TABLE 6-continued

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
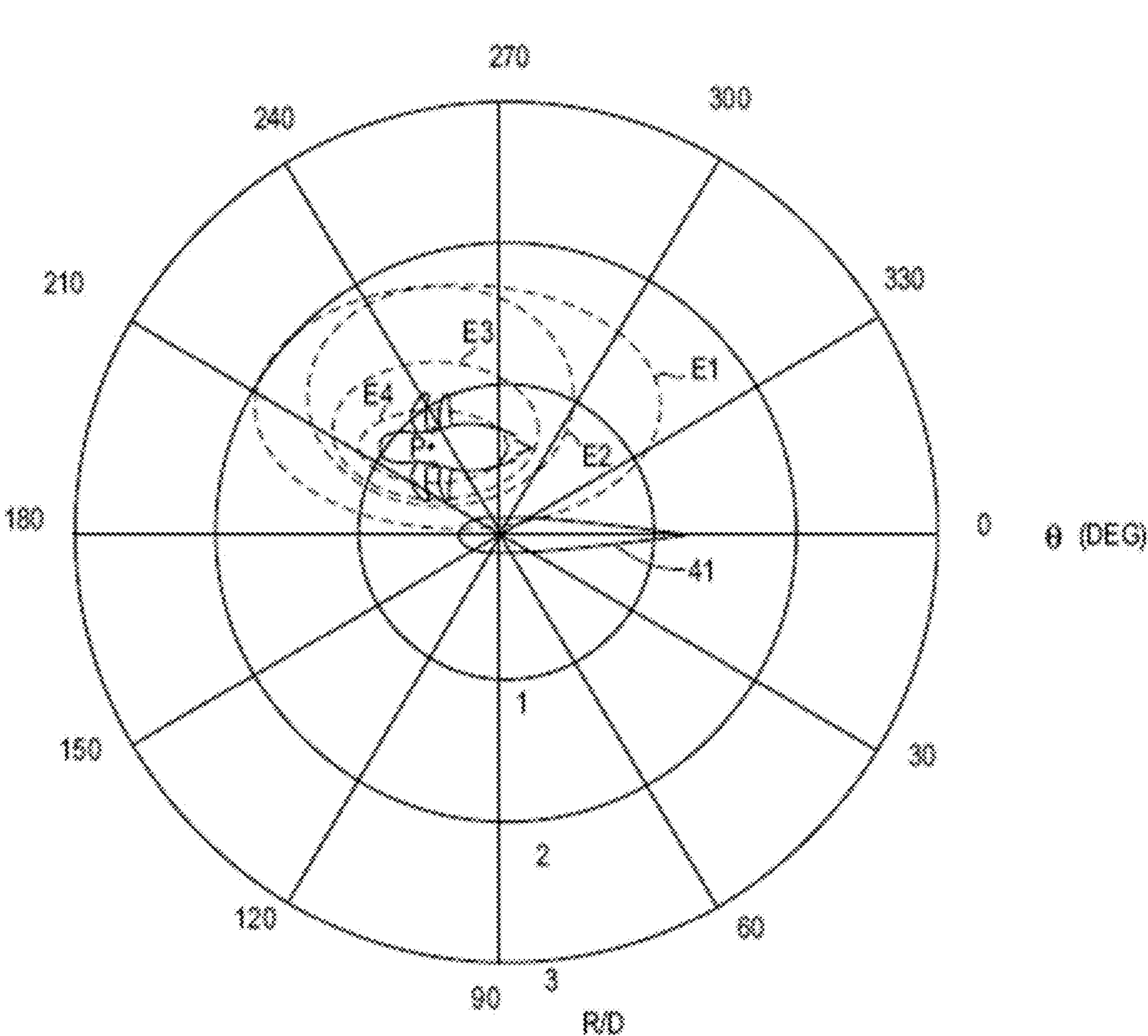
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line may be thought of as an axis passing through θ=0 deg and θ=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, $\rho_0$ is ambient air density, $V_o$ is cruise flight velocity, and $\Delta_{an}$ is fan stream tube cross-sectional area at the fan inlet. Fan annular area, $\Delta_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, it is contemplated that the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

Further improvements can be made with respect to the composition of fan blades for an unducted fan engine by forming blades out of composite material, which enables the size of the fan blades to be increased and/or by including a reduction gearbox to reduce the rotational speed of the fan, which results in a reduced fan pressure ratio of the fan. Combining the features of composite fan blades and a reduction gearbox with the features of the positioning of the propulsor relative to the aircraft wing by defining a P location between external OGV or IGV and a forward or aft rotating array of fan blades, respectively, and/or defining the distance from the effective QC to P, as described above, results in synergistic effects to improve aerodynamic performance of the aircraft, improve thrust without increasing the required engine power, and/or reduce noise during flight of the aircraft, when integrated with these additional design features.

For example, larger composite fan blades designed for lower rotational speed enable the use of higher bypass ratios and improved propulsion efficiency, especially when positioned relative to an aircraft wing's effective QC point, generating smoother airflow patterns over the wing, enhancing the lift-to-drag ratio and improving overall fuel efficiency. Furthermore, the larger composite fan blades designed for lower rotational speed may enhance the noise-reducing effects and/or reduced vibrations of an unducted propulsor positioned relative to the aircraft wing's effective QC point. Additionally, the reduced scrubbing effects from such optimized positioning may improve aerodynamic performance at higher angles of attack, while the larger composite fan blades offer greater thrust at lower rotational speeds. The combination may also improve performance in non-optimal flight conditions, such as during a high-altitude cruise or during a short takeoff or landing scenario, due to the enhanced thrust and aerodynamic coupling between the size of the fan blades and the location of the unducted propulsor on the wing.

Generally, a gas turbine engine, such as an unducted fan propulsor, includes a fan and a turbomachine, with the turbomachine rotating the fan to generate thrust. The turbomachine includes a compressor section, a combustion section, a turbine section, and an exhaust section and defines a working gas flowpath therethrough. With a gas turbine engine, and in particular with a high-bypass gas turbine engine, the gas turbine engine further defines a bypass ratio characterizing a ratio of a mass flowrate of airflow over the turbomachine to a mass flowrate of airflow through the working gas flowpath (more particularly defined above).

In order to provide high levels of thrust in a relatively efficient manner, certain gas turbine engines includes a relatively large fan. The inventors of the present disclosure sought out to design a gas turbine engine with a fan having an increased efficiency for a desired overall thrust output of the gas turbine engine.

Conventionally, fan blades are formed of a metal material, which generally provides for desirably thin and light fan blades. In some designs, the thickness of the fan blades drives a hub radius for the fan, which in turn affects an overall size of the fan, as a larger hub radius leads to a larger fan radius for a given thrust design point. While forming the fan blades out of metal is a cost effective manufacturing method that is widely used, the inventors found that a size of the fan blades may be limited with such construction due to the mechanical properties of the metal being used.

In particular, the inventors found that by forming fan blades of the fan out of a composite material, a size of the fan blades could be increased (both in radial length and chord length), as the composite material provides improved strength characteristics over certain metal materials traditionally used for fan blade design. This increase in size, the inventors found, allowed for a reduced fan pressure ratio for a given thrust design point of the gas turbine engine. More specifically, by forming the fan blades out of the composite material, the inventors designed the fan to have a lower solidity and lower fan blade count for the given thrust design point of the gas turbine engine as a result of the increased size of the fan blades.

Conventional design has indicated against such a change in fan blade composition, as forming the fan blades out of composite materials generally results in thicker fan blades, which can be challenging at the hub. However, the inventors found that the lower solidity and lower fan blade count allowed for the fan designed by the inventors to unexpectedly have a lower hub radius (particularly at the leading edge of the fan blades), improving efficiency of the fan at the hub, and allowing for overall shorter fan blades as the fan blades can "start" at a closer radial distance to a centerline of the gas turbine engine.

Further, the inventors of the present disclosure found that by including a reduction gearbox, a rotational speed of the fan may be reduced, further reducing the fan pressure ratio of the fan. While slowing the fan blades down too much can result in a stall at the fan during certain operations, by increasing the size of the fan blades, as is allowed through use of the composite fan blades, the inventors found that the fan may still provide for the desired mass flowrate of airflow thereacross to provide the desired thrust output.

In particular, the inventors discovered, unexpectedly, in the course of designing a gas turbine engine having a fan with composite fan blades, that the costs associated with inclusion of a fan with composite fan blades can be overcome by the aeronautical efficiency benefits to the fan in at least certain designs, contrary to previous thinking and expectations. In particular, the inventors discovered during the course of designing several gas turbine engines having fans with composite fan blades of varying thrust classes and aeronautical efficiency requirements (including the configurations illustrated and described in detail herein), a relationship exists among a leading edge tip radius of a fan blade of the fan, a leading edge hub radius of the fan, a trailing edge tip radius of the fan blade of the fan, and a trailing edge hub radius of the fan, whereby including a fan with composite fan blades in accordance with one or more of the exemplary aspects described herein may result in a net benefit to the overall gas turbine engine design. Notably, the leading edge and trailing edge hub radii (for given leading edge and trailing edge tip radii) are driven by, and correlate to, a solidity and fan blade count of the fan, as lower leading edge and trailing edge hub radii (for given leading edge and trailing edge tip radii) require a fan with a lower solidity and a lower fan blade count.

As briefly noted above, previous thinking was to form fan blades out of metal which avoids the costly process of manufacturing components using composite materials. Manufacturing components out of composite materials is either very labor intensive or requires significant upfront automation design costs. The inventors unexpectedly found that by forming the fan blades out of a composite material, the updated designs of the fan that are enabled result in gas turbine engines with aeronautical efficiency improvements that outweighed the challenges associated with manufacturing the fan blades using composite materials.

In particular, with a goal of arriving at an improved gas turbine engine capable of providing an improved aeronautical efficiency, the inventors proceeded in the manner of designing gas turbine engines having a fan (with composite fan blades) with various leading edge tip radii, leading edge hub radii, trailing edge tip radii, and trailing edge hub radii; checking an operability and aeronautical efficiency characteristics of the designed gas turbine engines; redesigning the gas turbine engines to vary the noted parameters based on the impact on other aspects of the gas turbine engines; rechecking the operability and aeronautical efficiency characteristics of the redesigned gas turbine engines; etc. during the design of several different types of fans with composite fan blades, including the fans with composite fan blades described herein, which are described below in greater detail.

Figure 12:
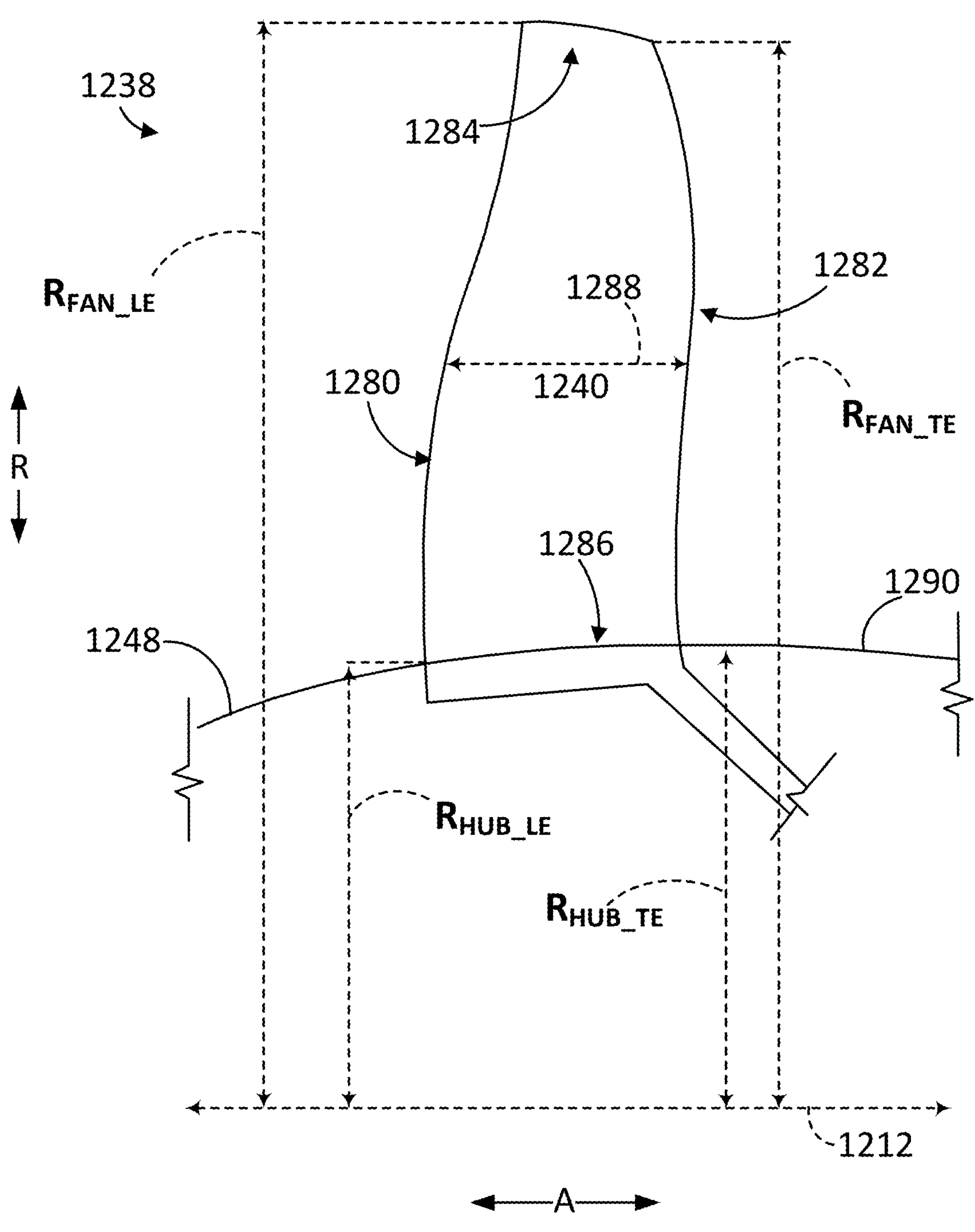
FIG. 12 is a close-up view of a blade of a gas turbine engine in accordance with an exemplary aspect of the present disclosure.

Referring now to FIG. 12, a close-up view is provided of a fan 1238 of a gas turbine engine, such as an unducted fan propulsor. For example, the fan 1238 may correspond to the fan 1452 of the gas turbine engine 1400 of FIG. 14, and in particular, a fan blade 1240 of the fan 1238 may correspond to the fan blade 1454 of the fan 1452 of FIG. 14. The fan 1238 may include a set of rotating fan blades 1240. The fan blade 1240 generally defines a leading edge 1280, a trailing edge 1282, an outer tip 1284 along the radial direction R, a base 1286 along the radial direction R, and a chord 1288 from the leading edge 1280 to the trailing edge 1282.

Further, it will be appreciated that the fan 1238 defines a leading edge (LE) fan radius $R_{Fan\_LE}$ of the fan blade 1240, a trailing edge (TE) fan radius $R_{Fan\_TE}$ of the fan blade 1240, a leading edge hub radius $R_{Hub\_LE}$ of the fan 1238, and a trailing edge hub radius $R_{Hub\_TE}$ of the fan 1238. The LE fan radius may also be referred to as the LE tip radius and the TE fan radius may also be referred to as the TE tip radius. The leading edge fan radius $R_{Fan\_LE}$ of the fan blade 1240 is a measure along the radial direction R from the longitudinal centerline 1212 of the gas turbine engine 1400 to the outer tip 1284 of the fan blade 1240 at the leading edge 1280. The trailing edge fan radius $R_{Fan\_TE}$ of the fan blade 1240 is a measure along the radial direction R from the longitudinal centerline 1212 of the gas turbine engine 1210 to the outer tip 1284 of the fan blade 1240 at the trailing edge 1282. The leading edge hub radius $R_{Hub\_LE}$ of the fan 1238 is a measure along the radial direction R from the longitudinal centerline 1212 of the gas turbine engine 1400 to the base 1286 of the fan blade 1240 at the leading edge 1280 (where the leading edge 1280 meets the spinner/front hub 1248). The trailing edge hub radius $R_{Hub\_TE}$ of the fan 1238 is a measure along the radial direction R from the longitudinal centerline 12 of the gas turbine engine 1400 to the base 1286 of the fan blade 1240 at the trailing edge 1282 (where the trailing edge 1282 meets a casing 1290 defining in part an airflow path to receive airflow from the fan 1238).

Further, it will be appreciated that the fan blade 1240 (and each of the fan blades 1240 of the fan 1238) are formed of a composite material. It will be appreciated that as used herein, the phrase "formed of a composite material," with reference to the fan blades 1240, refers to at least 80% by weight of the fan blades 1240, between the base 1286 and the outer tip 1284, being formed of one or more composite materials.

As alluded to earlier, the inventors discovered, unexpectedly during the course of designing gas turbine engines having a fan with composite fan blades—i.e., designing gas turbine engines having a fan (with composite fan blades) with various leading edge tip radii, leading edge hub radii, trailing edge tip radii, and trailing edge hub radii, and evaluating an overall engine and aeronautical efficiency performance—a significant relationship between the leading edge tip radii, leading edge hub radii, trailing edge tip radii, and trailing edge hub radii. The relationship can be thought of as an indicator of the ability of a gas turbine engine having a fan with composite fan blades to be able to provide a desired aeronautical efficiency for a given level of desired thrust output for the gas turbine engine. As will be appreciated, and as discussed above, the leading edge and trailing edge hub radii (for given leading edge and trailing edge tip radii) are driven by, and correlate to, a solidity and fan blade count of the fan, enabled by the formation of the fan blades out of composite materials, as lower leading edge and trailing edge hub radii (for given leading edge and trailing edge tip radii) require a fan with a lower solidity and a lower fan blade count.

The relationship applies to a gas turbine engine having a reduction gearbox to reduce a rotational speed of the fan relative to a driving turbine of a turbomachine of the gas turbine engine, a fan having fan blades formed of a composite material, and a high bypass ratio (i.e., a bypass ratio greater than or equal to 10). The relationship ties together a leading edge tip radius of a fan blade of the fan, a leading edge hub radius of the fan, a trailing edge tip radius of the fan blade of the fan, and a trailing edge hub radius of the fan, as described in more detail herein.

In particular, the inventors discovered that when designing a gas turbine engine, inclusion of a fan having fan blades with a large leading edge tip radius, the fan pressure ratio and rotational speed of the fan may be decreased, resulting generally in more efficiency. However, to avoid stall and generate a desired thrust output, a chord of the fan blades needs to be increased to ensure a sufficient airflow is provided through the fan. As the chord of the fan blade increases, the trailing edge tip radius of the fan blades may also increase to achieve a desired fan pressure ratio. Notably, however, the inventors found that increasing the leading edge tip radius too much resulted in increased weight and drag, offsetting the aerodynamic benefits otherwise achieved.

Further, with the chords of the fan blades increasing, the inventors of the present disclosure found that the solidity and fan blade count of the fan may be reduced, which may in turn result in lower leading edge and trailing edge hub radii (despite an increase in individual fan blade thickness as a result of forming the fan blades with composite materials). However, the inventors of the present disclosure found that the trailing edge hub radii could not be reduced too much without negatively affecting aerodynamics of an airflow into an inlet to the turbomachine, and the leading edge hub radii could not deviate too much from the trailing edge hub radii without negatively affecting a fan pressure ratio of the fan.

The relationship discovered, infra, can therefore identify a gas turbine engine having a fan having fan blades formed of a composite material, a reduction gearbox, and a high bypass ratio capable of achieving a desired aeronautical efficiency, while avoiding a prohibitive drag and weight increases, aerodynamic penalties, or combinations thereof and suited for particular mission requirements, one that takes into account efficiency, weight, structural needs for the fan blades, complexity, reliability, and other factors influencing the optimal choice for a gas turbine engine having a fan having fan blades formed of a composite material, a reduction gearbox, and a high bypass ratio.

In addition to yielding an improved gas turbine engine as noted above, utilizing this relationship, the inventors found that the number of suitable or feasible gas turbine engine designs capable of meeting the above design requirements could be greatly diminished, which facilitates a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

One such relationship providing for improved gas turbine engines, discovered by the inventors, is a Fan Leading Edge to Trailing Edge Compression Factor (FLTCF), expressed as:

$$FLTCF = \frac{R_{Fan_{LE}} \times R_{Hub_{TE}}}{R_{Fan_{TE}} \times R_{Hub_{LE}}}.$$

In the above expression of FLTCG, $R_{Fan\_LE}$ is a leading edge fan radius of a fan blade of a fan of a gas turbine engine, $R_{Fan\_TE}$ is a trailing edge fan radius of the fan blade of the fan of the gas turbine engine, $R_{Hub\_LE}$ is a leading edge hub radius of the fan of the gas turbine engine, and $R_{Hub\_TE}$ is a trailing edge hub radius of the fan of the gas turbine engine.

Another such relationship providing for the improved gas turbine engines, discovered by the inventors, is a Fan Leading Edge to Trailing Edge Opening Ratio (FLTOR), expressed as:

$$FLTOR = \frac{R_{Fan\_LE} - R_{Hub\_LE}}{R_{Fan\_TE} - R_{Hub\_TE}}.$$

In the above expression of FLTCG, $R_{Fan\_LE}$ is a leading edge fan radius of a fan blade of a fan of a gas turbine engine, $R_{Fan\_TE}$ is a trailing edge fan radius of the fan blade of the fan of the gas turbine engine, $R_{Hub\_LE}$ is a leading edge hub radius of the fan of the gas turbine engine, and $R_{Hub\_TE}$ is a trailing edge hub radius of the fan of the gas turbine engine.

Example engines in accordance with one or more exemplary embodiments of the present disclosure are provided in the table of FIG. 13. The FLTCF is valid only when it is greater than or equal to 1.05 and less than or equal to 1.8. For example, in certain exemplary embodiments, the FLTCF is greater than or equal to 1.07 and less than or equal to 1.65. Further, the FLTOR is valid only when it is greater than or equal to 1.03 and less than or equal to 1.5. For example, in certain exemplary embodiments, the FLTOR is greater than or equal to 1.05 and less than or equal to 1.3.

Notably, each of exemplary engines noted in FIG. 13 defines a bypass ratio greater than or equal to 10 and less than or equal to 30, such as greater than or equal to 13 and less than or equal to 25. Further, each of the exemplary engines noted in FIG. 13 includes a reduction gearbox (and thus may be referred to as a geared gas turbine engine) defining a gear ratio greater than or equal to 2 and less than or equal to 14.

For example, in one exemplary embodiment, the gas turbine engine may be an unducted gas turbine engine (also referred to as an "open rotor engine") including an unducted fan having fan blades formed of a composite material (see, e.g., the embodiment of FIG. 14, described below). In such an exemplary embodiment, a leading edge fan radius $R_{Fan\_LE}$ of a fan blade of the fan is greater than or equal to 65 inches and less than or equal to 85 inches, the fan defines a fan blade count greater than or equal to 5 and less than or equal to 15, a reduction gearbox defines a gear ratio greater than 4 and less than 12, and a thrust rating for the engine is between 20,000 pounds and 45,000 pounds. With such an exemplary embodiment the FLTCF is greater than or equal to 1.07 and less than or equal to 1.25, and the FLTOR is greater than or equal to 1.03 and less than or equal to 1.12. In such a manner, it will be appreciated that forming the fan blades of a composite material with this exemplary gas turbine engine enabled a size of the fan (both radially and in a chordwise direction) to be increased, allowing for a desired thrust output, despite a reduction in the fan blade count of the fan and solidity of the fan blades. Example 1 in FIG. 13 is an exemplary embodiment of such a gas turbine engine.

Further for example, in another exemplary embodiment, the gas turbine engine may be an unducted gas turbine engine (also referred to as an "open rotor engine") including an unducted fan having fan blades formed of a composite material (see, e.g., the embodiment of FIG. 14, described below). In such an exemplary embodiment, shown as Example 2 in FIG. 13, a leading edge hub radius $R_{Hub\_LE}$ may be 22.5, a trailing edge hub radius $R_{Hub\_TE}$ may be 24.7, a leading edge fan radius $R_{Fan\_LE}$ may be 82.2, a trailing edge fan radius $R_{Fan\_TE}$ may be 82.2, fan blade count may be 14, a thrust rating for the engine may be 35,000 pounds, the FLTCF may be 1.098, and the FLTOR may be 1.038.

In another exemplary embodiment, the gas turbine engine may be an unducted gas turbine engine (also referred to as an "open rotor engine") including an unducted fan having fan blades formed of a composite material (see, e.g., the embodiment of FIG. 14, described below). In such an exemplary embodiment, shown as Example 3 in FIG. 13, a leading edge hub radius $R_{Hub\_LE}$ may be 21.05, a trailing edge hub radius $R_{Hub\_TE}$ may be 23.27, a leading edge fan radius $R_{Fan\_LE}$ may be 76.8, a trailing edge fan radius $R_{Fan\_TE}$ may be 76.4, fan blade count may be 16, a thrust rating for the engine may be 35,000 pounds, the FLTCF may be 1.111, and the FLTOR may be 1.049.

In another exemplary embodiment, the gas turbine engine may be an unducted gas turbine engine (also referred to as an "open rotor engine") including an unducted fan having fan blades formed of a composite material (see, e.g., the embodiment of FIG. 14, described below). In such an exemplary embodiment, shown as Example 4 in FIG. 13, a leading edge hub radius $R_{Hub\_LE}$ may be 24, a trailing edge hub radius $R_{Hub\_TE}$ may be 24, a leading edge fan radius $R_{Fan\_LE}$ may be 82.2, a trailing edge fan radius $R_{Fan\_TE}$ may be 80.5, fan blade count may be 14, a thrust rating for the engine may be 35,000 pounds, the FLTCF may be 1.021, and the FLTOR may be 1.030.

In another exemplary embodiment, the gas turbine engine may be an unducted gas turbine engine (also referred to as an "open rotor engine") including an unducted fan having fan blades formed of a composite material (see, e.g., the embodiment of FIG. 14, described below). In such an exemplary embodiment, shown as Example 5 in FIG. 13, a leading edge hub radius $R_{Hub\_LE}$ may be 20.25, a trailing edge hub radius $R_{Hub\_TE}$ may be 20.25, a leading edge fan radius $R_{Fan\_LE}$ may be 69.7, a trailing edge fan radius $R_{Fan\_TE}$ may be 68.2, fan blade count may be 14, a thrust rating for the engine may be 20,000 pounds, the FLTCF may be 1.022, and the FLTOR may be 1.031.

In another exemplary embodiment, the gas turbine engine may be an unducted gas turbine engine (also referred to as an "open rotor engine") including an unducted fan having fan blades formed of a composite material (see, e.g., the embodiment of FIG. 14, described below). In such an exemplary embodiment, shown as Example 6 in FIG. 13, a leading edge hub radius $R_{Hub\_LE}$ may be 18.96, a trailing edge hub radius $R_{Hub\_TE}$ may be 21.07, a leading edge fan radius $R_{Fan\_LE}$ may be 69.3, a trailing edge fan radius $R_{Fan\_TE}$ may be 69.02, fan blade count may be 14, a thrust rating for the engine may be 20,000 pounds, the FLTCF may be 1.116, and the FLTOR may be 1.050.

In another exemplary embodiment, the gas turbine engine may be an unducted gas turbine engine (also referred to as an "open rotor engine") including an unducted fan having fan blades formed of a composite material (see, e.g., the embodiment of FIG. 14, described below). In such an exemplary embodiment, shown as Example 7 in FIG. 13, a leading edge hub radius $R_{Hub\_LE}$ may be 31.23, a trailing edge hub radius $R_{Hub\_TE}$ may be 34.63, a leading edge fan radius $R_{Fan\_LE}$ may be 115, a trailing edge fan radius $R_{Fan\_TE}$ may be 114.2, fan blade count may be 12, a thrust rating for the engine may be 65,000 pounds, the FLTCF may be 1.117, and the FLTOR may be 1.053.

Figure 14:
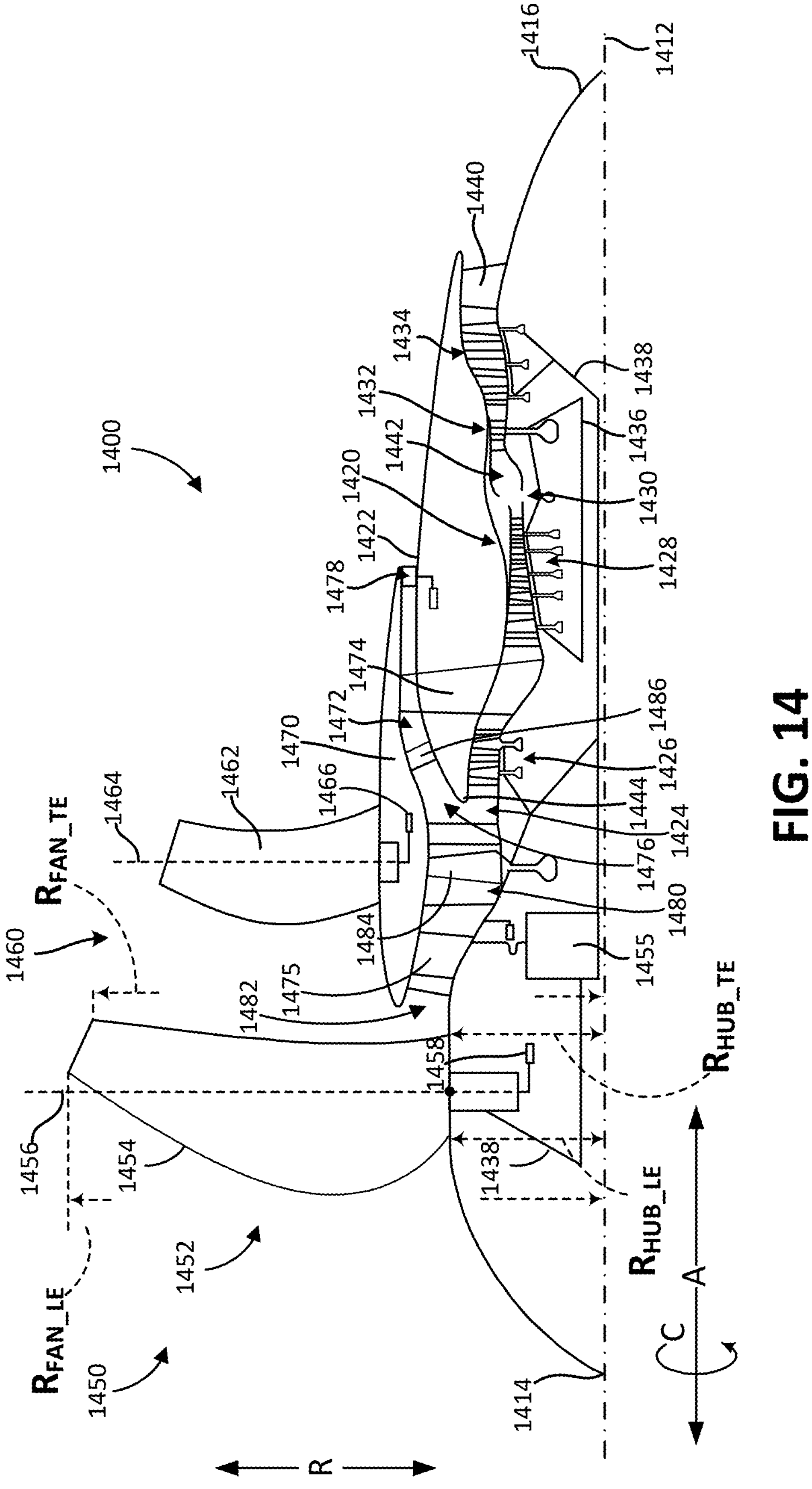
FIG. 14 is a cross-sectional view of a gas turbine engine in accordance with another exemplary aspect of the present disclosure.

Referring now to FIG. 14, a schematic cross-sectional view of a gas turbine engine 1400 is provided according to an example embodiment of the present disclosure. The exemplary gas turbine engine 1400 of FIG. 14 may be configured in substantially the same manner as the exemplary unducted fan propulsor 38 described above.

For example, the exemplary gas turbine engine 1400 defines an axial direction A, a radial direction R, and a circumferential direction C. Moreover, the engine 1400 defines an axial centerline or longitudinal axis 1412 that extends along the axial direction A. In general, the axial direction A extends parallel to the longitudinal axis 1412, the radial direction R extends outward from and inward to the longitudinal axis 1412 in a direction orthogonal to the axial direction A, and the circumferential direction extends three hundred sixty degrees (360°) around the longitudinal axis 1412. The engine 1400 extends between a forward end 1414 and an aft end 1416, e.g., along the axial direction A.

Further, the exemplary gas turbine engine 1400 generally includes a fan section 1450 and a turbomachine 1420. Generally, the turbomachine 1420 includes, in serial flow order, a compressor section, a combustion section, a turbine section, and an exhaust section. Particularly, as shown in FIG. 44, the turbomachine 1420 includes a core cowl 1422 that defines an annular core inlet 1424. The core cowl 1422 further encloses at least in part a low pressure system and a high pressure system. For example, the core cowl 1422 depicted encloses and supports at least in part a booster or low pressure ("LP") compressor 1426; a high pressure ("HP") compressor 1428; a combustor 1430; a high pressure turbine 1432; and a low pressure turbine 1434. The high pressure turbine 1428 drives the high pressure compressor 1428 through a high pressure shaft 1436. The low pressure turbine 1434 drives the low pressure compressor 1426 and components of the fan section 1450 through a low pressure shaft 1438, and as such may be referred to as a drive turbine. After driving each of the turbines 1432, 1434, combustion products exit the turbomachine 1420 through a turbomachine exhaust nozzle 1440.

Accordingly, the turbomachine 1420 defines a working gas flowpath or core duct 1442 that extends between the core inlet 1424 and the turbomachine exhaust nozzle 1440. The core duct 1442 is an annular duct positioned generally inward of the core cowl 1422 along the radial direction R. The core duct 1442 (e.g., the working gas flowpath through the turbomachine 120) may be referred to as a second stream.

The fan section 1450 includes a fan 1452, which is the primary fan in this example embodiment. The fan 1452 is an open rotor or unducted fan 1452. In such a manner, the gas turbine engine 1400 may be referred to as an open rotor engine.

As depicted, the fan 1452 includes an array of fan blades 1454 (only one shown in FIG. 14). The fan blades 1454 are rotatable, e.g., about the longitudinal axis 1412. Thus, the fan 1452 may include a set of rotatable fan blades 1454 that rotate when the gas turbine engine 1400 is in operation. As noted above, the fan 1452 is drivingly coupled with the low pressure turbine 1434 via the LP shaft 1438. As with the exemplary embodiments discussed above, the fan blades 1454 are formed of a composite material.

Further for the embodiments shown in FIG. 14, the fan 1452 is coupled with the LP shaft 1438 via a speed reduction gearbox 1455, e.g., in an indirect-drive or geared-drive configuration.

Moreover, the array of fan blades 1454 can be arranged in equal spacing around the longitudinal axis 1412. Each fan blade 1454 has a root and a tip and a span defined therebetween. Each fan blade 1454 defines a central blade axis 1456. For this embodiment, each fan blade 1454 of the fan 1452 is rotatable about its central blade axis 1456, e.g., in unison with one another. One or more actuators 1458 are provided to facilitate such rotation and therefore may be used to change a pitch of the fan blades 1454 about their respective central blades' axes 1456.

The fan section 1450 further includes a fan guide vane array 1460 that includes fan guide vanes 1462 (only one shown in FIG. 14) disposed around the longitudinal axis 1412. For this embodiment, the fan guide vanes 1462 are not rotatable about the longitudinal axis 1412. Each fan guide vane 1462 has a root and a tip and a span defined therebetween. The fan guide vanes 1462 may be unshrouded as shown in FIG. 14 or, alternatively, may be shrouded, e.g., by an annular shroud spaced outward from the tips of the fan guide vanes 1462 along the radial direction R or attached to the fan guide vanes 1462.

Each fan guide vane 1462 defines a central blade axis 1464. For this embodiment, each fan guide vane 1462 of the fan guide vane array 1460 is rotatable about its respective central blade axis 1464, e.g., in unison with one another. One or more actuators 1466 are provided to facilitate such rotation and therefore may be used to change a pitch of the fan guide vane 1462 about its respective central blade axis 1464. However, in other embodiments, each fan guide vane 1462 may be fixed or unable to be pitched about its central blade axis 1464. The fan guide vanes 1462 are mounted to the fan cowl 1470.

As shown in FIG. 14, in addition to the unducted fan 1452, a ducted fan 1484 is included aft of the fan 1452, such that the engine 1400 includes both a ducted and an unducted fan which both serve to generate thrust through the movement of air without passage through at least a portion of the turbomachine 1420 (e.g., without passage through the HP compressor 1428 and combustion section for the embodiment depicted). The ducted fan 1484 is rotatable about the same axis (e.g., the longitudinal axis 1412) as the fan blade 1454. The ducted fan 1484 is, for the embodiment depicted, driven by the low pressure turbine 1434 (e.g. coupled to the LP shaft 1438). In the embodiment depicted, as noted above, the fan 1452 may be referred to as the primary fan, and the ducted fan 1484 may be referred to as a secondary fan. It will be appreciated that these terms "primary" and "secondary" are terms of convenience, and do not imply any particular importance, power, or the like.

The ducted fan 1484 includes a plurality of fan blades (not separately labeled in FIG. 14) arranged in a single stage, such that the ducted fan 1484 may be referred to as a single stage fan. The fan blades of the ducted fan 1484 can be arranged in equal spacing around the longitudinal axis 1412. Each blade of the ducted fan 1484 has a root and a tip and a span defined therebetween.

The fan cowl 1470 annularly encases at least a portion of the core cowl 1422 and is generally positioned outward of at least a portion of the core cowl 1422 along the radial direction R. Particularly, a downstream section of the fan cowl 1470 extends over a forward portion of the core cowl 1422 to define a fan duct flowpath, or simply a fan duct 1472. According to this embodiment, the fan flowpath or fan duct 1472 may be understood as forming at least a portion of the third stream of the engine 1400.

Incoming air may enter through the fan duct 1472 through a fan duct inlet 1476 and may exit through a fan exhaust nozzle 1478 to produce propulsive thrust. The fan duct 1472 is an annular duct positioned generally outward of the core duct 1442 along the radial direction R. The fan cowl 1470 and the core cowl 1422 are connected together and supported by a plurality of substantially radially-extending, circumferentially-spaced stationary struts 1474 (only one shown in FIG. 14). The stationary struts 1474 may each be aerodynamically contoured to direct air flowing thereby. Other struts in addition to the stationary struts 1474 may be used to connect and support the fan cowl 1470 and/or core cowl 1422. In many embodiments, the fan duct 1472 and the core duct 1442 may at least partially co-extend (generally axially) on opposite sides (e.g., opposite radial sides) of the core cowl 1422. For example, the fan duct 1472 and the core duct 1442 may each extend directly from a leading edge 1444 of the core cowl 1422 and may partially co-extend generally axially on opposite radial sides of the core cowl 1422.

The engine 1400 also defines or includes an inlet duct 1480. The inlet duct 1480 extends between the engine inlet 1482 and the core inlet 1424/fan duct inlet 1476. The engine inlet 1482 is defined generally at the forward end of the fan cowl 1470 and is positioned between the fan 1452 and the fan guide vane array 1460 along the axial direction A. The inlet duct 1480 is an annular duct that is positioned inward of the fan cowl 1470 along the radial direction R. Air flowing downstream along the inlet duct 1480 is split, not necessarily evenly, into the core duct 1442 and the fan duct 1472 by a fan duct splitter or leading edge 1444 of the core cowl 1422. In the embodiment depicted, the inlet duct 1480 is wider than the core duct 1442 along the radial direction R. The inlet duct 1480 is also wider than the fan duct 1472 along the radial direction R.

Moreover, referring still to FIG. 14, in exemplary embodiments, air passing through the fan duct 1472 may be relatively cooler (e.g., lower temperature) than one or more fluids utilized in the turbomachine 1420. In this way, one or more heat exchangers 1486 may be positioned in thermal communication with the fan duct 1472. For example, one or more heat exchangers 1486 may be disposed within the fan duct 1472 and utilized to cool one or more fluids from the core engine with the air passing through the fan duct 1472, as a resource for removing heat from a fluid, e.g., compressor bleed air, oil or fuel.

Although not depicted in the example of FIG. 14, the heat exchanger 1486 may be an annular heat exchanger extending substantially 360 degrees in the fan duct 1472 (e.g., at least 300 degrees, such as at least 330 degrees). In such a manner, the heat exchanger 1486 may effectively utilize the air passing through the fan duct 1472 to cool one or more systems of the engine 1400 (e.g., lubrication oil systems, compressor bleed air, electrical components, etc.). The heat exchanger 1486 uses the air passing through duct 1472 as a heat sink and correspondingly increases the temperature of the air downstream of the heat exchanger 1486 and exiting the fan exhaust nozzle 1478.

As will be appreciated from the description herein, various other embodiments of a gas turbine engine are provided. Certain of these embodiments may be an unducted or single rotor gas turbine engine. Various additional aspects of one or more of these embodiments are discussed below. These exemplary aspects may be combined with one or more of the exemplary gas turbine engine(s) discussed above with respect to the figures.

In one or more of these embodiments, a threshold power or disk loading for a fan (e.g., an unducted single rotor or primary forward fan) may range from 25 horsepower per square foot (hp/ft$^2$) or greater at cruise altitude during a cruise operating mode. In particular embodiments of the engine, structures and methods provided herein generate power loading between 80 hp/ft$^2$ and 160 hp/ft$^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 pounds per square inch absolute (psia) and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

A fan pressure ratio (FPR) for the fan of the fan assembly can be 1.04 to 1.20, or in some embodiments 1.05 to 1.1, or in some embodiments less than 1.08, as measured across the fan blades at a cruise flight condition.

In order for the gas turbine engine to operate with a fan having the above characteristics and provide the benefits noted herein associated with forming the fan blades from a composite material, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than or equal to 2. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to 1500 revolutions per minute (rpm) at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

Further aspects of the disclosure are provided by the subject matter of the following clauses:

Clause 1: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

In the preceding clause, the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

In any of the preceding clauses, the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

In any of the preceding clauses, the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

In any of the preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

In any of the preceding clauses, the rotating blades diameter is between 8 to 16 feet or between 12 to 16 feet. In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

Clause 2: An aircraft is provided including a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein 0.065<RL/D<1.98 and θ is between 187° and 340°, and wherein RL/D and θ of the P of the unducted fan propulsor adhere to the following expressions:

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0.$$

In the preceding clause, 0.254<RL/D<1.86 and θ is between 199° and 306°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

In any of the two preceding clauses, 0.369<RL/D<1.43 and θ is between 204° and 291°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

In any of the three preceding clauses: 0.477<RL/D<0.9455 and θ is between 211° and 274°, and the P of the unducted fan propulsor is defined by the following expressions:

$$\frac{RL}{D}+\frac{\left(\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}<0.$$

In any of the four preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

Clause 3: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and θ is between 187° and 342°.

In any of the preceding clauses, 0.15≤RL/D.

In any of the preceding clauses, 0.35≤RL/D, and preferably RL/D is about 0.72.

In any of the preceding clauses, wherein θ is between 198° and 310°, and preferably between 205° and 285°.

In any of the preceding clauses, the unducted fan propulsor operates at a cruise flight Mach $M_0$ of between 0.5 and 0.9, preferably between 0.7 and 0.9, and more preferably between 0.75 and 0.9.

In any of the preceding clauses, the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $V_o$ is cruise flight velocity, and $\Delta_{an}$ is annular cross-sectional area perpendicular to an axis of rotation of a rotor axis of rotation.

In any of the preceding clauses, the unducted fan propulsor is undermounted to the airfoil with one or more intermediate structures.

In any of the foregoing clauses, the P of the unducted fan propulsor is variable to accommodate different operating conditions.

In any of the preceding clauses, the aircraft includes a plurality of the unducted fan propulsors.

In the preceding clause, the plurality of the unducted fan propulsors may be each mounted to the same airfoil, such as a wing or horizontal stabilizer; or the plurality of the unducted fan propulsors may be each mounted to different airfoils, such as a wing or horizontal stabilizer; or combinations thereof.

In any of the preceding clauses, wherein the unducted propulsor has two arrays of blades and only one of the array of blades is rotating.

Clause 4: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of counterclockwise rotating blades arranged in a forward array and a plurality clockwise rotating blades arranged in a rearward array, wherein one of the forward and rearward array of blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 5: An aircraft is provided that includes a fuselage; an airfoil extending from the fuselage, the airfoil having an airfoil section and the airfoil section having an effective quarter chord point (QC), and a plurality of rotating blades defining a maximum outer diameter (D); a point (P) located at an intersection of the CL and a line perpendicular to the CL that passes through a midpoint between leading and trailing edges nearest the root of one of the plurality of blades, and an ellipse origin positioning line (EOR) having a length (EORL) extending from the QC to an ellipse origin (OR) and at an angle θ measured positive in a counter-clockwise direction when the high pressure side of the airfoil section is below the airfoil section, and measured positive in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 6: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein 0.065<RL/D<1.98 and θ is between 187° and 340°; and wherein RL/D and θ of the P of the unducted fan propulsor adhere to the following expressions:

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0.$$

The aircraft of Clause 6, wherein:

0.254<RL/D<1.86 and θ is between 199° and 306°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

The aircraft of Clause 6, wherein:

0.369<RL/D<1.43 and θ is between 204° and 291°, and the P of the unducted fan propulsor is defined by the following expressions:

$$\frac{RL}{D}+\frac{\left(\sqrt{0.09923*\left[0.2964*\sin^2(\theta)-0.36*\cos^2(\theta)+0.66*\sin(\theta)*\cos(\theta)\right]}+0.3675*\sin(\theta)+0.0891*\cos(\theta)\right)}{0.49*\sin^2(\theta)+0.2025*\cos^2(\theta)}>0$$

and $$\frac{RL}{D}+\frac{\left(-\sqrt{0.09923*\left[0.2964*\sin^2(\theta)-0.36*\cos^2(\theta)+0.66*\sin(\theta)*\cos(\theta)\right]}+0.3675*\sin(\theta)+0.0891*\cos(\theta)\right)}{0.49*\sin^2(\theta)+0.2025*\cos^2(\theta)}<0.$$

The aircraft of Clause 6, wherein:

$0.477<RL/D<0.9455$ and θ is between 211° and 274°, and the P of the unducted fan propulsor is defined by the following expressions:

$$\frac{RL}{D}+\frac{\left(\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}<0.$$

The aircraft of Clause 6, wherein the unducted fan propulsor is undermounted to the airfoil with one or more intermediate structures.

The aircraft of Clause 6, wherein the P of the unducted fan propulsor is variable to accommodate different operating conditions.

Clause 7: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein $RL/D<2$ and θ is between 187° and 342°.

The aircraft of Clause 7, wherein $0.15\leq RL/D$.

The aircraft of Clause 7, wherein $0.35\leq RL/D$, and preferably RL/D is about 0.72.

The aircraft of Clause 7, wherein θ is between 198° and 310°, and preferably between 205° and 285°.

The aircraft of Clause 7, wherein the unducted fan propulsor operates at a cruise flight Mach $M_0$ of between 0.5 and 0.9, preferably between 0.7 and 0.9, and more preferably between 0.75 and 0.9.

The aircraft of Clause 7, wherein the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of Clause 7, wherein the unducted fan propulsor is undermounted to the airfoil with one or more intermediate structures.

The aircraft of Clause 7, wherein the P of the unducted fan propulsor is variable to accommodate different operating conditions.

Clause 8: A method of assembly, comprising: using an aircraft body comprising a fuselage and an airfoil extending from the fuselage, wherein the airfoil has an airfoil section defining an effective quarter chord point (QC); and attaching an unducted fan propulsor to the aircraft body relative to the airfoil section on a high pressure side thereof; the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a line HP perpendicular to the axial centerline CL that passes through the axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position; wherein $0.07\leq RL/D\leq 2.0$ and θ is between 187° and 342.°.

The method of Clause 8, wherein $0.15<RL/D$.

The method of Clause 8, wherein $0.35\leq RL/D$, and preferably RL/D is about 0.72.

The method of Clause 8, wherein θ is between 198° and 310°, and preferably between 205° and 285°.

The method of Clause 8, wherein the unducted fan propulsor operates at a cruise flight Mach $M_0$ of between 0.5 and 0.9, preferably between 0.7 and 0.9, and more preferably between 0.75 and 0.9.

The method of Clause 8, wherein the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $V_o$ is cruise flight velocity, and $\Delta_{an}$ is annular cross-sectional area perpendicular to an axis of rotation of a rotor axis of rotation.

The method of Clause 8, wherein the unducted fan propulsor is undermounted to the airfoil with one or more intermediate structures.

The method of Clause 8, wherein the P of the unducted fan propulsor is variable to accommodate different operating conditions.

Clause 9: A method of assembly, comprising: using an aircraft body comprising a fuselage and an airfoil extending from the fuselage, the airfoil having an airfoil section with a leading edge (LE) and a trailing edge (TE), a chord extending between the LE and TE, and an effective quarter chord point (QC) along the chord measured from the LE, wherein the airfoil has an airfoil section defining an effective quarter chord point (QC); and attaching an unducted fan propulsor to the aircraft body relative to the airfoil section on a high pressure side thereof; the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

The method of Clause 9, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The method of Clause 9, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The method of Clause 9, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

Clause 10: An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein $0.07 \leq RL/D \leq 2.0$ and θ is between 187° and 342°.

Clause 11: An aircraft comprising:

a fuselage;

a pair of horizontal stabilizers extending relative to the fuselage, two or more unducted fan propulsors, each of the unducted fan propulsors is mounted relative to one of the horizontal stabilizers on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a clockwise direction when the high pressure side of the airfoil section is above the airfoil section when viewed looking from an outboard position towards an inboard position of the wing; wherein $0.07 \leq RL/D \leq 2.0$ and θ is between 187° and 342°.

In any of the preceding clauses, the unducted fan propulsor is undermounted to the airfoil, such as a wing, with one or more intermediate structures.

In any of the preceding clauses, the P of the unducted fan propulsor is variable to accommodate different operating conditions.

In any of the preceding clauses the drive mechanism may be a gas turbine engine and associated transmission to delivers torque from the drive mechanism to the propeller assembly.

In any of the preceding clauses, the unducted fan propulsor is incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9.

In any of the preceding clauses, the unducted fan propulsors is connected to the wing (or horizontal stabilizer) through a pylon.

In any of the preceding clauses, the rotating blades diameter (D) may be between 8 to 16 feet or 12 to 16 feet.

In any of the preceding clauses, each of the propulsors including a drive mechanism comprising a gas turbine engine assembly comprising in serial order a compressor, combustor, high pressure turbine and power turbine.

In any of the preceding clauses, the propulsor having a pitch angle between −5 and +5 degrees, or −3 and θ degrees.

In any of the preceding clauses, the propulsor having an inward toe angle of between 0 and 5 degrees, or 1 and 3 degrees.

In any of the preceding clauses, the rotating blades diameter is between 8 to 16 feet or between 12 to 16 feet.

In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

A gas turbine engine defining a radial direction, the gas turbine engine comprising: a turbomachine comprising a drive turbine and defining a working gas flowpath and an inlet to the working gas flowpath; a fan having a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the gas turbine engine defining a bypass ratio equal to a mass flowrate of an airflow from the fan over the turbomachine to a mass flowrate of an airflow from the fan through the inlet to the working gas flowpath during operation of the gas turbine engine in a cruise operating mode, the bypass ratio being greater than or equal to 10 and less than or equal to 30; and a reduction gearbox mechanically coupling the drive turbine of the turbomachine to the fan; wherein the gas turbine engine defines a Fan Leading Edge to Trailing Edge Compression Factor (FLTCF) greater than or equal to 1.05 and less than or equal to 1.8, the FLTCF being equal to:

$$\frac{R_{Fan\_LE} \times R_{Hub\_TE}}{R_{Fan\_TE} \times R_{Hub\_LE}}.$$

The gas turbine engine of any preceding clause, wherein the FLTCF is greater than or equal to 1.07 and less than or equal to 1.65.

The gas turbine engine of any preceding clause, wherein the bypass ratio is greater than or equal to 13 and less than or equal to 25.

The gas turbine engine of any preceding clause, wherein the turbomachine comprises a compressor section having a low pressure compressor and a high pressure compressor, wherein the low pressure compressor is rotatable with the drive turbine.

The gas turbine engine of any preceding clause, further comprising: an outer nacelle surrounding at least in part the fan.

The gas turbine engine of any preceding clause, wherein the fan is an unducted fan.

The gas turbine engine of any preceding clause, wherein the leading edge fan radius $R_{Fan\_LE}$ is greater than or equal to 65 inches and less than or equal to 85 inches, and wherein the fan defines a fan blade count greater than or equal to 5 and less than or equal to 15.

The gas turbine engine of any preceding clause, wherein the FLTCF is greater than or equal to 1.07 and less than or equal to 1.25.

The gas turbine engine of any preceding clause, wherein the leading edge fan radius $R_{Fan\_LE}$ is greater than or equal to 35 inches and less than or equal to 50 inches, wherein the fan defines a fan blade count greater than or equal to 12 and less than or equal to 23, and wherein the reduction gearbox defines a gear ratio between 2:1 and 4:1.

The gas turbine engine of any preceding clause, wherein the FLTCF is greater than or equal to 1.12 and less than or equal to 1.35.

The gas turbine engine of any preceding clause, wherein the gas turbine engine defines a Fan Leading Edge to Trailing Edge Opening Ratio (FLTOR) greater than or equal to 1.03 and less than or equal to 1.5, the FLTOR being equal to:

$$\frac{R_{Fan\_LE} - R_{Hub\_LE}}{R_{Fan\_TE} - R_{Hub\_TE}}.$$

A gas turbine engine defining a radial direction, the gas turbine engine comprising: a turbomachine comprising a drive turbine and defining a working gas flowpath and an inlet to the working gas flowpath; a fan having a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the gas turbine engine defining a bypass ratio equal to a mass flowrate of an airflow from the fan over the turbomachine to a mass flowrate of an airflow from the fan through the inlet to the working gas flowpath during operation of the gas turbine engine in a cruise operating mode, the bypass ratio being greater than or equal to 10 and less than or equal to 30; and a reduction gearbox mechanically coupling the drive turbine of the turbomachine to the fan; wherein the gas turbine engine defines a Fan Leading Edge to Trailing Edge Opening Ratio (FLTOR) greater than or equal to 1.03 and less than or equal to 1.5, the FLTOR being equal to:

$$\frac{R_{Fan\_LE} - R_{Hub\_LE}}{R_{Fan\_TE} - R_{Hub\_TE}}.$$

The gas turbine engine of any preceding clause, wherein the FLTOR is greater than or equal to 1.05 and less than or equal to 1.3.

The gas turbine engine of any preceding clause, wherein the bypass ratio is greater than or equal to 13 and less than or equal to 25.

The gas turbine engine of any preceding clause, further comprising: an outer nacelle surrounding at least in part the fan.

The gas turbine engine of any preceding clause, wherein the fan is an unducted fan.

The gas turbine engine of any preceding clause, wherein the leading edge fan radius $R_{Fan\_LE}$ is greater than or equal to 65 inches and less than or equal to 85 inches, wherein the fan defines a fan blade count greater than or equal to 5 and less than or equal to 15, and wherein the FLTOR is greater than or equal to 1.05 and less than or equal to 1.2.

The gas turbine engine of any preceding clause, wherein the leading edge fan radius $R_{Fan\_LE}$ is greater than or equal to 35 inches and less than or equal to 50 inches, wherein the fan defines a fan blade count greater than or equal to 12 and less than or equal to 23, wherein the reduction gearbox defines a gear ratio between 2:1 and 4:1, and wherein the FLTOR is greater than or equal to 1.07 and less than or equal to 1.18.

The gas turbine engine of any preceding clause, wherein the gas turbine engine defines a Fan Leading Edge to Trailing Edge Compression Factor (FLTCF) greater than or equal to 1.05 and less than or equal to 1.8, the FLTCF being equal to:

$$\frac{R_{Fan\_LE} - R_{Hub\_TE}}{R_{Fan\_TE} - R_{Hub\_LE}}.$$

The gas turbine engine of any preceding clause, wherein the fan is an unducted fan, wherein the leading edge fan radius $R_{Fan\_LE}$ is greater than or equal to 65 inches and less than or equal to 85 inches, wherein the fan defines a fan blade count greater than or equal to 5 and less than or equal to 15, wherein the reduction gearbox defines a gear ratio greater than 4 and less than 12, wherein a thrust rating for the gas turbine engine is between 20,000 pounds and 45,000 pounds, wherein the FLTCF is greater than or equal to 1.07 and less than or equal to 1.25, and wherein the FLTOR is greater than or equal to 1.03 and less than or equal to 1.12.

The gas turbine engine of any preceding clause, wherein the fan is a ducted fan, wherein the leading edge fan radius $R_{Fan\_LE}$ is greater than or equal to 35 inches and less than or equal to 50 inches, wherein the fan defines a fan blade count greater than or equal to 12 and less than or equal to 23, wherein the reduction gearbox defines a gear ratio greater than 2 and less than 4, wherein a thrust rating for the gas turbine engine is between 20,000 pounds and 45,000 pounds, wherein the FLTCF is greater than or equal to 1.12 and less than or equal to 1.35, and wherein the FLTOR is greater than or equal to 1.06 and less than or equal to 1.19.

The gas turbine engine of any preceding clause, wherein the fan is a ducted fan, wherein the leading edge fan radius $R_{Fan\_LE}$ is greater than or equal to 51 inches and less than or equal to 66 inches, wherein the fan defines a fan blade count greater than or equal to 17 and less than or equal to 23, wherein a thrust rating for the gas turbine engine is between 60,000 pounds and 118,000 pounds, wherein the FLTCF is greater than or equal to 1.27 and less than or equal to 1.5, and wherein the FLTOR is greater than or equal to 1.18 and less than or equal to 1.5.

The gas turbine engine of any preceding clause, wherein the fan is a ducted fan, wherein the leading edge fan radius $R_{Fan\_LE}$ is greater than or equal to 55 inches and less than or equal to 70 inches, wherein the fan defines a fan blade count greater than or equal to 12 and less than or equal to 22, wherein a thrust rating for the gas turbine engine is between 100,000 pounds and 150,000 pounds, wherein the FLTCF is greater than or equal to 1.46 and less than or equal to 1.65, and wherein the FLTOR is greater than or equal to 1.2 and less than or equal to 1.5.

An aircraft comprising: a fuselage; a pair of wings extending from the fuselage; two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial mid-point between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC; a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein $0.07 \leq RL/D \leq 2.0$ and θ is between 187° and 342°; wherein each of the two or more unducted fan propulsors comprises a turbomachine comprising a drive turbine and defining a working gas flowpath and an inlet into the working gas flowpath; wherein the rotating blades include a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the unducted fan propulsor defining a bypass ratio equal to a mass flowrate of an airflow from the rotating blades over the turbomachine to a mass flowrate of an airflow from the rotating blades through the inlet to the working gas flowpath during operation of unducted fan propulsor in a cruise operating mode, the bypass ratio being greater than or equal to 10 and less than or equal to 30; and a reduction gearbox mechanically coupling the drive turbine of the turbomachine to the rotating blades; wherein the unducted fan propulsor defines a Fan Leading Edge to Trailing Edge Compression Factor (FLTCF) greater than or equal to 1.05 and less than or equal to 1.8, the FLTCF being equal to:

$$\frac{R_{Fan_{LE}} \times R_{Hub_{TE}}}{R_{Fan_{TE}} \times R_{Hub_{LE}}}.$$

The aircraft of any preceding clause, wherein $0.15 \leq RL/D$.

The aircraft of any preceding clause, wherein $0.35 \leq RL/D$, and preferably RL/D is about 0.72.

The aircraft of any preceding clause, wherein θ is between 198° and 310°, and preferably between 205° and 285°.

The aircraft of any preceding clause, wherein the two or more unducted fan propulsors are configured to operate at a cruise flight Mach M0 of between 0.7 and 0.9, and more preferably between 0.75 and 0.9; or the two or more unducted fan propulsors are configured to propel the aircraft at a cruise flight Mach M0 of between 0.7 and 0.9, and more preferably between 0.75 and 0.85.

The aircraft of any preceding clause, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_0$ is cruise flight velocity, and $A_{an}$ is annular cross-sectional area perpendicular to an axis of rotation of a rotor axis of rotation.

The aircraft of any preceding clause, wherein the unducted fan propulsor is undermounted to the airfoil with one or more intermediate structures.

The aircraft of any preceding clause, wherein the unducted fan propulsor defines a Fan Leading Edge to Trailing Edge Opening Ratio (FLTOR) greater than or equal to 1.03 and less than or equal to 1.5, the FLTOR being equal to:

$$\frac{R_{Fan_{LE}} - R_{Hub_{LE}}}{R_{Fan_{TE}} - R_{Hub_{TE}}}.$$

An aircraft, comprising: a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7; wherein each of the two or more unducted fan propulsors comprises a turbomachine comprising a drive turbine and defining a working gas flowpath and an inlet into the working gas flowpath; wherein the rotating blades include a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the unducted fan propulsor defining a bypass ratio equal to a mass flowrate of an airflow from the unducted fan propulsor over the turbomachine to a mass flowrate of an airflow from the rotating blades through the inlet to the working gas flowpath during operation of the unducted fan propulsor in a cruise operating mode, the bypass ratio being greater than or equal to 10 and less than or equal to 30; and a reduction gearbox mechanically coupling the drive turbine of the turbomachine to the rotating blades; wherein the unducted fan propulsor defines a Fan Leading Edge to Trailing Edge Opening Ratio (FLTOR) greater than or equal to 1.03 and less than or equal to 1.5, the FLTOR being equal to:

$$\frac{R_{Fan_{LE}} - R_{Hub_{LE}}}{R_{Fan_{TE}} - R_{Hub_{TE}}}.$$

The aircraft of any preceding clause, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The aircraft of any preceding clause, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The aircraft of any preceding clause, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

An aircraft, comprising: a fuselage; an airfoil extending from the fuselage, the airfoil having an airfoil section defining an effective quarter-chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

$$\frac{RL}{D} + \frac{\left(\frac{\sqrt{\begin{array}{c}1.4161*\left[1.88978*\sin^2(\theta) - 0.0875*\right.\\ \left.\cos^2(\theta) + 0.477*\sin(\theta)*\cos(\theta)\right]\end{array}} +}{1.764*\sin(\theta) + 0.19146*\cos(\theta)}\right)}{1.96*\sin^2(\theta) + 0.7225*\cos^2(\theta)} > 0$$

and $$\frac{RL}{D} + \frac{\left(\frac{-\sqrt{\begin{array}{c}1.4161*\left[1.88978*\sin^2(\theta) - 0.0875*\right.\\ \left.\cos^2(\theta) + 0.477*\sin(\theta)*\cos(\theta)\right]\end{array}} +}{1.764*\sin(\theta) + 0.19146*\cos(\theta)}\right)}{1.96*\sin^2(\theta) + 0.7225*\cos^2(\theta)} > 0;$$

wherein each of the two or more unducted fan propulsors comprises a turbomachine comprising a drive turbine and defining a working gas flowpath and an inlet into the working gas flowpath; wherein the rotating blades include a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the unducted fan propulsor defining a bypass ratio equal to a mass flowrate of an airflow from the rotating blades over the turbomachine to a mass flowrate of an airflow from the rotating blades through the inlet to the working gas flowpath during operation of unducted fan propulsor in a cruise operating mode, the bypass ratio being greater than or equal to 10 and less than or equal to 30; and a reduction gearbox mechanically coupling the drive turbine of the turbomachine to the rotating blades; wherein the unducted fan propulsor defines a Fan Leading Edge to Trailing Edge Compression Factor (FLTCF) greater than or equal to 1.05 and less than or equal to 1.8, the FLTCF being equal to:

$$\frac{R_{Fan_{LE}} \times R_{Hub_{TE}}}{R_{Fan_{TE}} \times R_{Hub_{LE}}}.$$

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. An aircraft comprising:

a fuselage;

a pair of wings extending from the fuselage;

two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°;

wherein each of the two or more unducted fan propulsors comprises a turbomachine comprising a drive turbine and defining a working gas flowpath and an inlet into the working gas flowpath;

wherein the rotating blades include a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the unducted fan propulsor defining a bypass ratio equal to a mass flowrate of an airflow from the rotating blades over the turbomachine to a mass flowrate of an airflow from the rotating blades through the inlet to the working gas flowpath during operation of unducted fan propulsor in a cruise operating mode, the bypass ratio being greater than or equal to 10 and less than or equal to 30; and a reduction gearbox mechanically coupling the drive turbine of the turbomachine to the rotating blades;

wherein the unducted fan propulsor defines a Fan Leading Edge to Trailing Edge Compression Factor (FLTCF) greater than or equal to 1.05 and less than or equal to 1.8, the FLTCF being equal to:

$$\frac{R_{Fan_{LE}} \times R_{Hub_{TE}}}{R_{Fan_{TE}} \times R_{Hub_{LE}}}.$$

2. The aircraft of claim 1, wherein 0.15≤RL/D.

3. The aircraft of claim 1, wherein 0.35≤RL/D, and preferably RL/D is about 0.72.

4. The aircraft of claim 1, wherein θ is between 198° and 310°, and preferably between 205° and 285°.

5. The aircraft of claim 1, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

6. The aircraft of claim 1, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

7. The aircraft of claim 1, wherein the unducted fan propulsor is undermounted to the airfoil with one or more intermediate structures.

8. The aircraft of claim 1, wherein the unducted fan propulsor defines a Fan Leading Edge to Trailing Edge Opening Ratio (FLTOR) greater than or equal to 1.03 and less than or equal to 1.5, the FLTOR being equal to:

$$\frac{R_{Fan_{LE}} \times R_{Hub_{LE}}}{R_{Fan_{TE}} \times R_{Hub_{TE}}}.$$

9. An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7;

wherein each of the two or more unducted fan propulsors comprises a turbomachine comprising a drive turbine and defining a working gas flowpath and an inlet into the working gas flowpath;

wherein the rotating blades include a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the unducted fan propulsor defining a bypass ratio equal to a mass flowrate of an airflow from the unducted fan propulsor over the turbomachine to a mass flowrate of an airflow from the rotating blades through the inlet to the working gas flowpath during operation of the unducted fan propulsor in a cruise operating mode, the bypass ratio being greater than or equal to 10 and less than or equal to 30; and a reduction gearbox mechanically coupling the drive turbine of the turbomachine to the rotating blades;

wherein the unducted fan propulsor defines a Fan Leading Edge to Trailing Edge Opening Ratio (FLTOR) greater than or equal to 1.03 and less than or equal to 1.5, the FLTOR being equal to:

$$\frac{R_{Fan_{LE}} \times R_{Hub_{LE}}}{R_{Fan_{TE}} \times R_{Hub_{TE}}}.$$

10. The aircraft of claim 9, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

11. The aircraft of claim 9, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

12. The aircraft of claim 9, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

13. An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein $0.065<RL/D<1.98$ and θ is between 187° and 340°; and wherein RL/D and θ of the P of the unducted fan propulsor adhere to the following expressions:

$$\frac{RL}{D} + \frac{\left(\sqrt{1.4161*\left[1.88978*\sin^2(\theta) - 0.0875*\cos^2(\theta) + 0.477*\sin(\theta)*\cos(\theta)\right]} + 1.764*\sin(\theta) + 0.19146*\cos(\theta)\right)}{1.96*\sin^2(\theta) + 0.7225*\cos^2(\theta)} > 0$$

and $$\frac{RL}{D} + \frac{\left(-\sqrt{1.4161*\left[1.88978*\sin^2(\theta) - 0.0875*\cos^2(\theta) + 0.477*\sin(\theta)*\cos(\theta)\right]} + 1.764*\sin(\theta) + 0.19146*\cos(\theta)\right)}{1.96*\sin^2(\theta) + 0.7225*\cos^2(\theta)} > 0;$$

wherein each of the two or more unducted fan propulsors comprises a turbomachine comprising a drive turbine and defining a working gas flowpath and an inlet into the working gas flowpath;

wherein the rotating blades include a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the unducted fan propulsor defining a bypass ratio equal to a mass flowrate of an airflow from the rotating blades over the turbomachine to a mass flowrate of an airflow from the rotating blades through the inlet to the working gas flowpath during operation of unducted fan propulsor in a cruise operating mode, the bypass ratio being greater than or equal to 10 and less than or equal to 30; and a reduction gearbox mechanically coupling the drive turbine of the turbomachine to the rotating blades;

wherein the unducted fan propulsor defines a Fan Leading Edge to Trailing Edge Compression Factor (FLTCF) greater than or equal to 1.05 and less than or equal to 1.8, the FLTCF being equal to:

$$\frac{R_{Fan_{LE}} \times R_{Hub_{TE}}}{R_{Fan_{TE}} \times R_{Hub_{LE}}}.$$

* * * * *